United States Patent
Fuchs et al.

(10) Patent No.: US 12,427,406 B2
(45) Date of Patent: *Sep. 30, 2025

(54) INTERACTIVE COMPUTING DEVICES AND ACCESSORIES

(71) Applicant: Arkade, Inc., Centennial, CO (US)

(72) Inventors: Joshua Allan Fuchs, Granada Hills, CA (US); Joel Abraham Kort, Van Nuys, CA (US); Charles Michael Seltzer, Sag Harbor, NY (US); Bob Steven Berns, Hidden Hills, CA (US)

(73) Assignee: Arkade, Inc., Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,088

(22) Filed: May 27, 2022

(65) Prior Publication Data

US 2022/0288488 A1 Sep. 15, 2022

Related U.S. Application Data

(63) Continuation of application No. 17/017,190, filed on Sep. 10, 2020, now Pat. No. 11,344,796, which is a
(Continued)

(51) Int. Cl.
*A63F 13/245* (2014.01)
*A63F 13/211* (2014.01)
(Continued)

(52) U.S. Cl.
CPC .......... *A63F 13/245* (2014.09); *A63F 13/211* (2014.09); *A63F 13/235* (2014.09);
(Continued)

(58) Field of Classification Search
CPC .... A63F 13/245; A63F 13/211; A63F 13/235; A63F 13/428; A63F 13/533; A63F 13/837; A63F 13/92; G06T 19/006
See application file for complete search history.

(56) References Cited

U.S. PATENT DOCUMENTS 5,641,288 A 6/1997 Zaenglein, Jr.
6,020,885 A 2/2000 Honda
(Continued)

FOREIGN PATENT DOCUMENTS

CN 206631173 11/2017
WO WO-2007/130582 11/2007

OTHER PUBLICATIONS

Analog Stick. Wikipedia.org. Online. Jul. 30, 2018. Accessed via the Internet. Accessed May 8, 2020. <URL: https://en.wikipedia.org/w/index.php?title=Analog_stick&oldid=852699675> (Year: 2018).

(Continued)

*Primary Examiner* — Carl V Larsen
(74) *Attorney, Agent, or Firm* — Pierson Ferdinand LLP; Daniel Rose

(57) ABSTRACT

A human interface device (HID)-compatible portable gaming device includes a display; a position sensor; a joystick; and a processor in communication with the display, the joystick, and the position sensor. The processor has programmed instructions that, when executed, cause the processor to receive a first signal from the position sensor indicating a change in orientation of the portable gaming device, receive a second signal from the joystick indicating a change in position of the joystick, assign a first weight to the first signal and a second weight to the second signal; aggregate the first signal with the second signal based on a weighted sum of the weighted first signal and the weighted second signal to obtain a third signal, and update a user interface on the display according to the third signal.

11 Claims, 15 Drawing Sheets

Related U.S. Application Data continuation of application No. 16/746,734, filed on Jan. 17, 2020, now Pat. No. 10,773,157, which is a continuation-in-part of application No. 16/523,891, filed on Jul. 26, 2019, now Pat. No. 10,946,272.

(51) Int. Cl.

| | | |
|---|---|---|
| A63F 13/235 | (2014.01) | |
| A63F 13/428 | (2014.01) | |
| A63F 13/533 | (2014.01) | |
| A63F 13/837 | (2014.01) | |
| A63F 13/92 | (2014.01) | |
| G06T 19/00 | (2011.01) | |

(52) U.S. Cl.
CPC .......... *A63F 13/428* (2014.09); *A63F 13/533* (2014.09); *A63F 13/837* (2014.09); *A63F 13/92* (2014.09); *G06T 19/006* (2013.01)

(56) References Cited

U.S. PATENT DOCUMENTS

| | | | |
|---|---|---|---|
| 6,054,991 A | 4/2000 | Crane et al. | |
| 6,184,847 B1 | 2/2001 | Fateh et al. | |
| 6,396,497 B1 | 5/2002 | Reichlen | |
| 6,684,062 B1 | 1/2004 | Gosior et al. | |
| 6,966,837 B1 | 11/2005 | Best | |
| 7,319,992 B2 | 1/2008 | Gaos | |
| 8,303,405 B2 | 11/2012 | Zalewski et al. | |
| 8,310,656 B2* | 11/2012 | Zalewski | A63F 13/213 356/28 |
| 8,469,824 B1* | 6/2013 | Farley | F41J 5/02 434/21 |
| 8,814,682 B2 | 8/2014 | Yamashita et al. | |
| 9,041,741 B2 | 5/2015 | Mabbutt et al. | |
| 9,110,505 B2 | 8/2015 | Mastandrea, Jr. | |
| 9,724,601 B2 | 8/2017 | Fujita et al. | |
| 10,021,149 B2 | 7/2018 | Miller | |
| 10,075,750 B2 | 9/2018 | Gordon et al. | |
| 10,155,170 B2 | 12/2018 | Ikeda et al. | |
| 10,471,345 B1 | 11/2019 | Fuchs et al. | |
| 10,630,773 B2 | 4/2020 | Holmes | |
| 10,635,202 B1* | 4/2020 | Nietfeld | A63F 13/218 |
| 10,773,157 B1* | 9/2020 | Fuchs | A63F 13/211 |
| 11,344,796 B2* | 5/2022 | Fuchs | A63F 13/837 |
| 2002/0045484 A1* | 4/2002 | Eck | A63F 13/35 463/42 |
| 2002/0128064 A1 | 9/2002 | Sobota | |
| 2004/0178576 A1 | 9/2004 | Hillis et al. | |
| 2005/0197178 A1 | 9/2005 | Villegas | |
| 2007/0021210 A1 | 1/2007 | Tachibana | |
| 2008/0227543 A1* | 9/2008 | Kawase | A63F 13/10 463/31 |
| 2008/0300055 A1* | 12/2008 | Lutnick | G07F 17/3209 463/39 |
| 2009/0197679 A1 | 8/2009 | Argentar | |
| 2009/0280901 A1 | 11/2009 | Casparian et al. | |
| 2009/0325710 A1* | 12/2009 | Filer | A63F 13/211 463/37 |
| 2010/0255903 A1 | 10/2010 | Bala | |
| 2010/0304868 A1 | 12/2010 | Zalewski | |
| 2011/0102460 A1* | 5/2011 | Parker | A63F 13/213 707/E17.044 |
| 2012/0302348 A1 | 11/2012 | Karacal et al. | |
| 2013/0090165 A1 | 4/2013 | Shikata et al. | |
| 2013/0109473 A1* | 5/2013 | Yamashita | A63F 13/2145 463/31 |
| 2013/0225295 A1* | 8/2013 | Lee | A63F 13/807 463/37 |
| 2014/0179423 A1 | 6/2014 | Deng et al. | |
| 2014/0213365 A1* | 7/2014 | Cao | A63F 13/245 463/37 |
| 2014/0280692 A1 | 9/2014 | Cotter | |
| 2014/0364063 A1* | 12/2014 | Bell | A63F 13/32 455/41.2 |
| 2015/0087414 A1 | 3/2015 | Chen et al. | |
| 2015/0141145 A1 | 5/2015 | Perlman et al. | |
| 2015/0229509 A1 | 8/2015 | Castine | |
| 2015/0238855 A1 | 8/2015 | Uy et al. | |
| 2016/0283078 A1* | 9/2016 | Lin | G06F 3/0488 |
| 2016/0321947 A1 | 11/2016 | Toronto et al. | |
| 2016/0343164 A1 | 11/2016 | Urbach et al. | |
| 2017/0072307 A1 | 3/2017 | Perry et al. | |
| 2017/0072309 A1* | 3/2017 | Perry | A63F 13/77 |
| 2017/0354864 A1 | 12/2017 | Rogers et al. | |
| 2017/0354878 A1 | 12/2017 | Posin | |
| 2017/0354895 A1 | 12/2017 | Dornbusch et al. | |
| 2017/0365102 A1 | 12/2017 | Huston et al. | |
| 2018/0104574 A1 | 4/2018 | Tager | |
| 2018/0143976 A1 | 5/2018 | Huston | |
| 2018/0264321 A1 | 9/2018 | Nir et al. | |
| 2019/0081848 A1* | 3/2019 | Zou | A63F 13/213 |
| 2019/0270019 A1 | 9/2019 | Miura et al. | |
| 2019/0321732 A1 | 10/2019 | Zimring et al. | |
| 2020/0108312 A1* | 4/2020 | Chen | A63F 13/426 |

OTHER PUBLICATIONS

AR Blaster—360° Augmented Reality Video Game—Smart Phone Toy Gun Controller for iPhone & Android phones—Bluetooth 4.2 Mar. 24, 2020, 7 pages from url link: https://www.amazon.com/AR-Blaster-Augmented-Reality-Controller-Bluetooth/dp/B0762T1YYK/ref=pd_sbs_147_4/143-0087825-2430220?_encoding=UTF8&pd_rd_i=B0762T1YYK&pd_rd_r=ffc5351e-f9ba-4c51-ad97-cb3097544121&pd_rd_w=mx37J&pd_rd_wg=F34Wd&pf_rd_p=7cd8f929-4345-4bf2-a554-7d7588b3dd5f&pf_rd_r=Z3N3YWQZ715NJRFJQFVY&psc=1&refRID=Z3N3YWQZ715NJRFJQF.

AR Blaster Augmented Reality 360 Degree Portable Gaming VR Gun: Wireless Bluetooth Controller Toy Pistol for iOS Phone and Android Smartphones Mar. 24, 2020, 7 pages from url link: https://www.amazon.com/AR-BLASTER-Augmented-Reality-Portable/dp/B07769PM5L/ref=pd_rhf_eeolp_p_img_5?_encoding=UTF8&psc=1&refRID=34N965YW8TV4Y45CPECQ Mar. 24, 2020.

AR Game Gun Augmented Reality VR Gun Controller Joysticker Gamepad for Video Game with Bluetooth Connecting iOS, Android Smart Phone iPad TV Box Shooting Game Mar. 24, 2020, 4 pages, from url link: https://www.amazon.com/Augmented-Controller-Joysticker-Bluetooth-Connecting/dp/B06XT11RNW/ref=pd_di_sccai_1/144-3233725-9935121?_encoding=UTF8&pd_rd_i=B06XT11RNW&pd_rd_r=77ef4782-0163-4631-9e66-216524c94ca3&pd_rd_w=j0PaW&pd_rd_wg=54eYz&pf_rd_p=e532f109-986a-4c2d-85fc-16555146f6b4&pf_rd_r=W6V7AC8ZJX3.

AR Games Gun Augmented Reality Bluetooth Game Controller with Cell Phone Stand Holder Portable and Eco-Friendly AR Toy with 360? AR Games for iPhone Android (L Green) Mar. 24, 2020, 4 pages from url link: https://www.amazon.com/Augmented-Bluetooth-Controller-Portable-Eco-Friendly/dp/B0737BSQJ5/ref=pd_sbs_147_12?_encoding=UTF8&pd_rd_i=B0737BSQJ5&pd_rd_r=ffc5351e-f9ba-4c51-ad97-cb3097544121&pd_rd_w=mx37J&pd_rd_wg=F34Wd&pf_rd_p=7cd8f929-4345-4bf2-a554-7d7588b3dd5f&pf_rd_r=Z3N3YWQZ715NJRFJQFVY&psc=.

AR Games Gun. Amazon.com. Online. Jun. 22, 2017. Accessed via the Internet. Accessed May 11, 2020. (Year: 2017).

AR Games Gun. Amazon.com. Online. Jun. 22, 2017. Accessed via the Internet. Accessed May 11, 2020. <URL: https://www.amazon.com/Augmented-Bluetooth-Controller-Portable-Eco-Friendly/dp/B0737BSQJ> (Year: 2017).

AR Super Space Gun New AR Augmented Reality Technology Portable Bluetooth Game Gun for Smart Phones Sale VR Virtual Reality Online Game Mar. 24, 2020, 5 pages from url link: https://www.amazon.com/Augmented-Technology-Bluetooth-Smart-Thanksgiving/dp/B077G925W9/ref=pd_sbs_147_2/143-0087825-2430220?_encoding=UTF8&pd_rd_i=B077G925W9&pd_rd_r=4462b707-830f-498f-b30d-27ed09634928&pd_rd_w=CNqyh&pd_rd_wg=B0IL6&pf_rd_p=7cd8f929-4345-4bf2-a554-7d7588b3dd5f&pf_rd_r=V45C6T2VP8TXZXV3KR8J&psc=1&refRID=V45C6T.

(56) References Cited

OTHER PUBLICATIONS

AR Toy Gun with 38 Games Bluetooth 3D Virtual Reality VR Game Toys for Android iOS Phones Mar. 24, 2020 from url link: https://www.amazon.com/Bluetooth-Virtual-Reality-Android-Phones/dp/B07KBTT3BV/ref=pd_sbs_21_1/143-0087825-2430220?_encoding=UTF8&pd_rd_i=B07KBTT3BV&pd_rd_r=ac895c7c-cbe3-4b21-ae06-85475f759e04&pd_rd_w=pe6ak&pd_rd_wg=zGUn2&pf_rd_p=7cd8f929-4345-4bf2-a554-7d7588b3dd5f&pf_rd_r=9FYAG5XQRX6JSWANBSV4&psc=1&refRID=9FYAG5XQRX6JSWANBSV4 Mar. 24, 2020.

ArtCreativity Blade Runner Toy Pistol. Amazon.com. Online. Feb. 21, 2019. Accessed via the Internet. Accessed May 8, 2020. < URL: https://www.amazon.com/pistola-artcreativity-incluidas-resistente-pl%C3%A1 stico/dp/B0797BBT1 J/> (Year: 2019).

DoinMaster Bluetooth Gamepad Shooting AR Gun Joystick for Android iOS Phone iPhone iPad AR Game Controller with Motor Vibration Mar. 24, 2020, 7 pages from url link: https://www.amazon.com/DoinMaster-Bluetooth-Shooting-Controller-Vibration/dp/B07V78Z5D2/ref=pd_sbs_147_1/143-0087825-2430220?_encoding=UTF8&pd_rd_i=B07V78Z5D2&pd_rd_r=ffc5351e-f9ba-4c51-ad97-cb3097544121&pd_rd_w=mx37J&pd_rd_wg=F34Wd&pf_rd_p=7cd8f929-4345-4bf2-a554-7d7588b3dd5f&pf_rd_r=Z3N3YWQZ715NJRFJQFVY&psc=1&refRID=Z3N3YWQZ715NJ.

Doinmaster Bluetooth Gamepad. Amazon.com. Online Jul. 14, 2019. Accessed via the Internet. Accessed May 8, 2020. < URL: https://www.amazon.com/Dain Master-Bluetooth-Shooting-Controller-Vibration/dp/B07V78Z5 D2/> (Year: 2019).

IPega PG-9057 Phantom ShoX Blaster Bluetooth Gun Game Controller Wireless Bluetooth 3.0 With Stand for Android 3.2 IOS 7.0 Above Smartphones Tablet PC Win7 Win8 Win10 Computer Mar. 24, 2020, 4 pages from url link: https://www.amazon.com/iPega-p.9057-Bluetooth-Controller- Smartphones/dp/B01MU7YA5l/ref=pd_sbs_147_15?_encoding=UTF8&pd_rd_i=B01MU7YA5l&pd_rd_r=ffc5351e-f9ba-4c51-ad97-cb3097544121&pd_rd_w=mx37J&pd_rd_wg=F34Wd&pf_rd_p=7cd8f929-4345-4bf2-a554-7d7588b3dd5f&pf_rd_r=Z3N3YWQZ715NJRFJQFVY&p.

Qkifly AR Game Gun. Amazon.com. Online. Dec. 2, 2016. Accessed via the Internet. Accessed May 8, 2020. < URL: https://www.amazon.com/Augmented-Controller-Joysticker-Bluetooth-Connecting/dp/B06XT11 RNW/> (Year: 2016).

Sharper Image Augmented Virtual Reality Toy Blaster, Complete Video Gaming System, Connects to Smartphone via Bluetooth, Use with Free AR App, Games for Teens and Kids, Lime Green/Blue/Orange Mar. 24, 2020, 7 pages from url link: https://www.amazon.com/Sharper-Image-Augmented-Smartphone-Bluetooth/dp/B07BRFRPMY/ref=pd_sbs_21_8?_encoding=UTF8&pd_rd_i=B07BRFRPMY&pd_rd_r=64e669ad-5a4f-49ba-aece-4e60701b72b9&pd_rd_w=lwoi2&pd_rd_wg=kO9MI&pf_rd_p=7cd8f929-4345-4bf2-a554-7d7588b3dd5f&pf_rd_r=268ESN8N75.

Sharper Image Virtual Reality Interactive Blaster Mar. 24, 2020, 5 pages from url link: https://www.amazon.com/Sharper-Image-Virtual-Reality-Blaster/dp/B07KFM4X4C/ref=pd_sbs_147_3/143-0087825-2430220?_encoding=UTF8&pd_rd_i=B07KFM4X4C&pd_rd_r=ffc5351e-f9ba-4c51-ad97-cb3097544121&pd_rd_w=mx37J&pd_rd_wg=F34Wd&pf_rd_p=7cd8f929-4345-4bf2-a554-7d7588b3dd5f&pf_rd_r=Z3N3YWQZ715NJRFJQFVY&psc=1&refRID=Z3N3YWQZ715NJRFJQFVY Mar. 24, 2020.

What is HDbitT? hdbitt.org. Online. Apr. 16, 2018. Accessed via the Internet. Accessed May 11, 2020. (Year: 2018).

What is HDbitT? hdbitt.org. Online. Apr. 16, 2018. Accessed via the Internet. Accessed May 11, 2020. <URL: https://web.archive.org/web/20180416182117/http://www.hdbitt.org:80/what-is-hdbitt.html> (Year: 2018).

Wikipedia.org, "Analog stick", online. Jul. 30, 2018. Accessed via the Internet. Accessed Oct. 8, 2021. <URL: https://en.wikipedia.org/w/index.php?title=Analog stick&oldid=852699675> (Year: 2018).

* cited by examiner

INTERACTIVE COMPUTING DEVICES AND ACCESSORIES

CROSS-REFERENCE TO RELATED APPLICATIONS

This application claims the benefit of and priority as a continuation of U.S. patent application Ser. No. 17/017,190, entitled "Interactive Computing Devices and Accessories," filed Sep. 10, 2020; which claims benefit of priority as a continuation of U.S. patent application Ser. No. 16/746,734, entitled "Interactive Computing Devices and Accessories," filed Jan. 17, 2020; which claims benefit of priority as a continuation-in-part of U.S. patent application Ser. No. 16/523,891, entitled "PC Blaster Game Console," filed Jul. 26, 2019, each of which is hereby incorporated by reference in its entirety.

BACKGROUND

The following description is provided to assist the understanding of the reader. None of the information provided or references cited is admitted to be prior art.

Video game consoles today typically use an external remote controller to allow a user to interact with a game being processed by the video game console. Video game consoles are generally connected to an external screen (e.g., a television) that remains stationary in relation to the video game consoles. The stationary screens can inhibit gamers that wish to move around and receive a more interactive experience. While users can move various characters or other figures on the stationary screens through controller inputs, the users may feel disconnected from the game they are playing. For example, a user may move a character through a virtual battlefield displayed on a stationary screen. The user may fire at other characters on an enemy team on the virtual battlefield using a joystick and various push buttons that correspond to various actions. The user may not feel connected to the game because pressing push buttons and moving a joystick is dissimilar from being on the battlefield itself, impairing immersion and realism of the simulation.

Furthermore, in many instances, different interfaces used for controlling avatars or interacting with a computing device may present issues with useability and functionality. Different physical interfaces may be more or less accurate or may be more or less capable of fine control by a user. For example, a touchscreen interactive control may have a limited accuracy with regard to a particular point or pixel, because the user's finger or thumb is significantly larger than the pixel or point. As a result, it may be difficult for a user to accurately select a desired point with such interfaces, and developers may have to compensate with larger interactive controls. The same or similar issues are present in many other physical interfaces to various degrees: for example, a user attempting to aim a three-dimensional interface device such as a wireless remote incorporating an accelerometer at a single point may have inaccuracy due to small tremors in the muscles of the hand, wrist, arm, and/or shoulder.

SUMMARY

Implementations of the systems and methods discussed herein provide improvements in interactive control of computing devices. For example, in some implementations, to provide for finer accuracy when controlling an avatar or interacting with an application, an interaction device may include a plurality of different physical controls that may be used separately or together to provide finer control and accuracy. In some implementations for example, a three-dimensional interface device incorporating an accelerometer or other inertial measurement unit (IMU) may also include a joystick. The signals from the IMU and joystick may be used independently in some implementations, though this may present difficulties in integrating signals from the joystick with other control data in an intuitive manner. For example, in some instances, a computing device may be configured to have a joystick signal override a position sensor signal any time the joystick is moved. The override can make it difficult for users to use both the joystick and any position sensors on the controller to navigate virtual environments. Instead, the systems and methods discussed herein provide scaling and aggregation functions that enable intuitive and natural use of mixed interface devices (e.g. IMU and joystick), including content-based scaling functions, threshold-based scaling functions, control-based scaling functions, and other integrations that enable users to intuitively control interfaces, virtual environments, avatars, menu interfaces, or other interactive elements.

In accordance with at least some aspects, the present disclosure discloses a human interface device (HID)-compatible portable gaming device. The HID-compatible portable gaming device comprises a display, a position sensor, a joystick, and a processor in communication with the display, the joystick, and the position sensor. The processor has programmed instructions that, when executed, cause the processor to receive a first signal from the position sensor indicating a change in orientation of the portable gaming device, receive a second signal from the joystick indicating a change in position of the joystick, assign a first weight to the first signal and a second weight to the second signal, aggregate the first signal with the second signal based on a weighted sum of the weighted first signal and the weighted second signal to obtain a third signal; and update a user interface on the display according to the third signal.

In some implementations, the HID-compatible portable gaming device includes instructions that, when executed, further cause the processor to determine a type of content being displayed on a user interface of the display; and assign the first weight to the first signal and the second weight to the second signal based on the determined type of content being displayed on the user interface. The type of content being displayed on the user interface of the display is determined based on the objects being displayed on the display or based on a current state of an application being executed by one of the processor or a second device in communication with the portable gaming device.

In some implementations, the HID-compatible portable gaming device includes instructions that, when executed, further cause the processor to dynamically adjust one or both of the first weight and the second weight responsive to different types of content being displayed on the user interface. In a further implementation, the programmed instructions, when executed, further cause the processor to adjust one or both of the first weight of the first signal and the second weight of the second signal to increase a ratio of the second weight to the first weight, responsive to the determined type of content corresponding to a zoomed-in view of an environment displayed by the user interface. In a still further implementation, the programmed instructions, when executed, further cause the processor to determine a distance within a three-dimensional environment displayed by the user interface between a viewpoint of the user interface and an entity within the three-dimensional environment corresponding to a cursor position of the user interface; and adjust the second weight proportional to the determined distance within the three-dimensional environment. In another further implementation, the type of content is a heads up display (HUD) and the first weight is larger than the second weight. In still another further implementation, the programmed instructions, when executed, further cause the processor to identify the type of content based on a type of an application being executed by one of the processor or a second device in communication with the portable gaming device. In yet still another further implementation, the type of content is a menu and the second weight is zero.

In some implementations, the HID-compatible portable gaming device includes instructions that, when executed, further cause the processor to assign the first weight to the first signal and the second weight to the second signal by comparing the first signal indicating the change in orientation of the portable gaming device to a threshold; and assigning the first weight to be zero, responsive to the first signal being less than the threshold. In some implementations, the HID-compatible portable gaming device includes instructions that, when executed, further cause the processor to assign the first weight to the first signal and the second weight to the second signal by comparing the second signal indicating the change in position of the joystick to a threshold; and assigning the second weight to a value less than the first weight, responsive to the second signal being less than the threshold. In some implementations, the HID-compatible portable gaming device includes instructions that, when executed, further cause the processor to assign the first weight to the first signal and the second weight to the second signal by comparing the second signal indicating the change in position of the joystick to a threshold; and responsive to the second signal exceeding the threshold, reducing the first weight of the first signal indicating the change in orientation of the portable gaming device.

In some implementations, the position sensor comprises at least one of a gyroscope or an accelerometer. In some implementations, the joystick is depressible, and the programmed instructions, when executed, further cause the processor to receive a fourth signal indicating that the joystick has been pressed; responsive to receiving the fourth signal, identify a predetermined command that corresponds to the joystick being pressed; and update the user interface on the display based on the predetermined command. In a further implementation, the programmed instructions, when executed, further cause the processor to adjust one or both of the first weight and the second weight, responsive to receiving the fourth signal.

In accordance with other aspects, the present disclosure discloses an HID-compatible portable gaming device. The HID-compatible portable gaming device comprises a grip portion configured to accommodate a first hand of a user and an elongated portion extending from the grip portion configured to accommodate a second hand of the user. The elongated portion comprises a joystick positioned to be articulated by a thumb of the second hand of the user, when the second hand of the user is positioned on the elongated portion.

In some implementations, the grip portion comprises a trigger positioned to be actuated by an index finger of the first hand of the user; and wherein the elongated portion extends from the grip portion in a direction aligned with the trigger. In some implementations, the elongated portion further comprises one or more buttons positioned to be actuated by a corresponding one or more fingers of the second hand of the user, when the second hand of the user is positioned on the elongated portion. In a further implementation, the joystick is positioned on a first side of the elongated portion, and the one or more buttons are positioned on a second side of the elongated portion opposite the first side. In some implementations, the elongated portion further comprises a plurality of lighted segments. In a further implementation, the controller includes a plurality of switched outputs connected to the corresponding plurality of lighted segments, the controller configured to control the plurality of switched outputs to activate the corresponding plurality of lighted segments according to a signal received from one of a processor of the HID-compatible portable gaming device or a processor of a second device in communication with the HID-compatible portable gaming device. In another further implementation, the plurality of lighted segments are positioned in a row on one side of the elongated portion. In still another further implementation, the plurality of lighted segments positioned in a plurality of rows on a plurality of sides of the elongated portion.

In some implementations, the elongated portion further comprises an adjustable clamp for a portable computing device comprising a display. In a further implementation, the adjustable clamp is positioned proximate to a terminal portion of the elongated portion adjacent to the grip portion, and the joystick is positioned proximate to an opposing terminal portion of the elongated portion. In some implementations, the portable gaming device comprises processor positioned inside of at least one of the elongated portion or the grip portion, the processor in communication with a display coupled to the elongated portion. In some implementations, the elongated portion further comprises a plurality of ridges positioned on an underside of the elongated portion. In some implementations, the elongated portion further comprises one or more buttons positioned to be actuated by the thumb of the second hand of the user when the second hand of the user is positioned on the elongated portion. In a further implementation, the joystick is positioned on a same side of the elongated portion as the one or more buttons. In a still further implementation, the elongated portion further comprises a second one or more buttons positioned to be actuated by corresponding one or more fingers of the second hand of the user, wherein the second hand of the user is positioned on the elongated portion. In some implementations, the grip portion comprises a pedal system, the pedal system including a pedal pivotally coupled to a portion of the grip portion such that the pedal is pivotable between a plurality of positions.

In accordance with yet other aspects, the present disclosure discloses an HID-compatible portable gaming device. The HID-compatible portable gaming device comprises a display, a position sensor, and a joystick. The HID-compatible portable gaming device further comprises a first wireless communication interface utilizing a first physical communication protocol; and a second wireless communication interface utilizing a second physical communication protocol different from the first physical communication protocol. The first wireless communication interface is configured to transmit, via the first physical communication protocol, at least one signal representative of a position of the position sensor or the joystick to a remote computing device. The second wireless communication interface is configured to receive, via the second physical communication protocol from the remote computing device, a media stream, the media stream rendered by the display.

In some implementations, the first physical communication protocol is Bluetooth, and the second physical communication protocol is WiFi. In a further implementation, the second wireless communication interface utilizes a lossy transport layer communication protocol. In a still further implementation, the first wireless communication interface utilizes a lossless transport layer communication protocol. In some implementations, the gaming device includes a processor having programmed instructions that, when executed, cause the processor to receive a first signal from the position sensor and a second signal from the joystick, and aggregate the first signal and second signal into a third signal, the third signal transmitted to the remote computing device. In a further implementation, the programmed instructions, when executed, further cause the processor to aggregate the first signal and the second signal as a sum of weighted signals. In a still further implementation, the programmed instructions, when executed, further cause the processor to adjust weights of the first signal and second signal responsive to a signal of the joystick exceeding a predetermined threshold. In another still further implementation, the programmed instructions, when executed, further cause the processor to dynamically adjust weights of the first signal and second signal responsive to a signal received, via the first wireless communication interface, from the remote computing device. In a yet still further implementation, the signal received from the remote computing device identifies a state of an application executed by the remote computing device.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
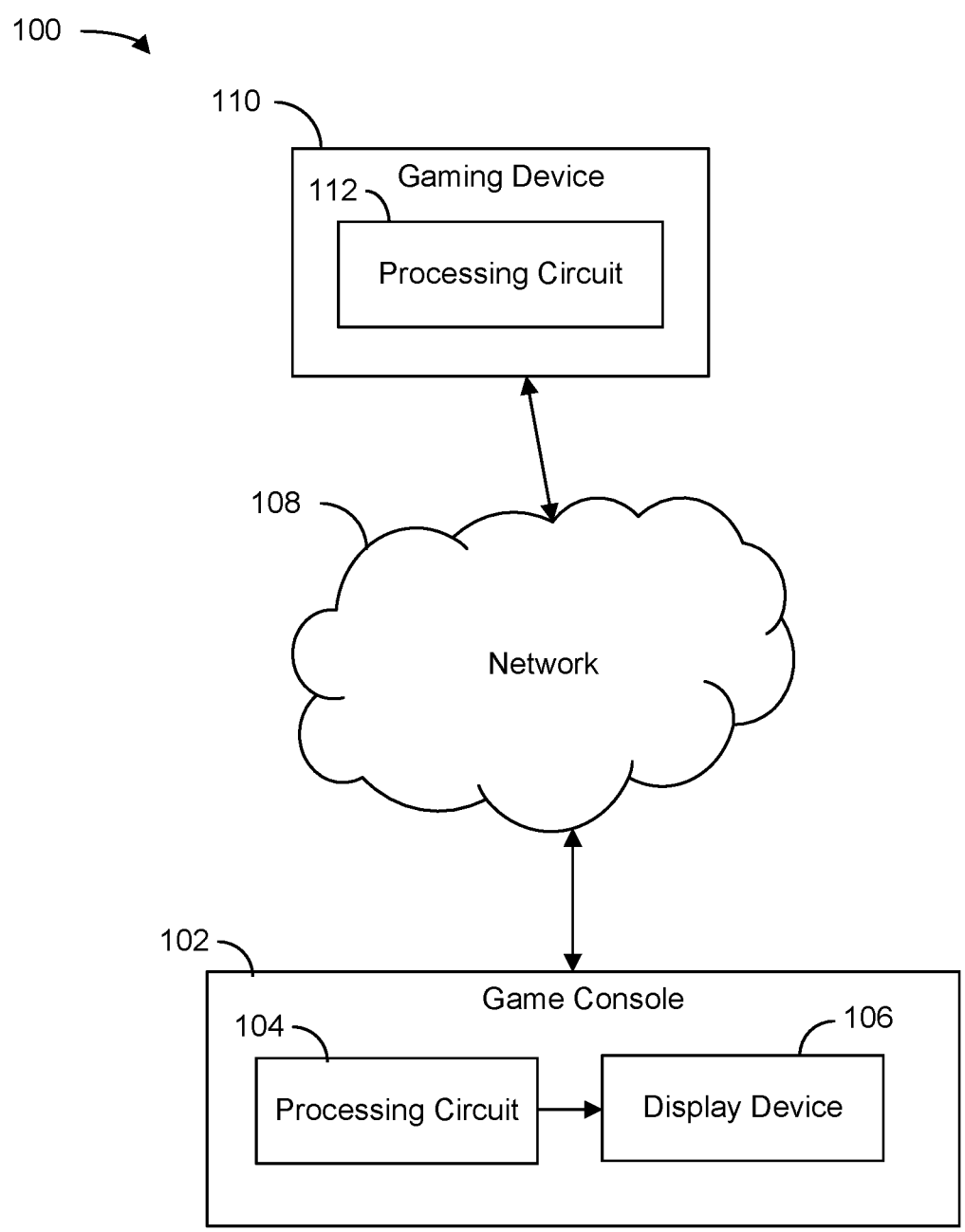
FIG. 1 is a block diagram of a gaming environment, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a game console including a processing circuit, a game console housing, a joystick, and a screen display. The processing circuit may be internally coupled to the game console housing. The screen display may be coupled to the game console housing via an external component (e.g., a screen holder). The processing circuit can communicate with the screen display to display a user interface on the screen display. The processing circuit can process various applications and/or games to display and update the user interface. The processing circuit can receive inputs from the joystick, various buttons, and/or detected movements of the game console housing. The processing circuit can update the user interface based on the inputs.

Exemplary embodiments described herein provide a game console with a game console housing that may be shaped to resemble a blaster device (e.g., a rifle, a shotgun, a machine gun, a grenade launcher, a rocket launcher, etc.). The game console housing may include a barrel, a handle, a trigger, sensors (e.g., accelerometers, gyroscopes, magnetometers, etc.), a joystick, and various buttons on the exterior of the game console housing. The game console may also include a processing circuit internally coupled to the game console housing that processes applications and/or games that are associated with the game console. The game console may include a screen display that is coupled to the barrel of the game console housing. The screen display may display a user interface that is generated by the processing circuit and that is associated with the applications and/or games that the processing circuit processes. The screen display may be coupled to the game console so an operator using (e.g., playing or operating) the game console may view the user interface that is generated by the processing circuit on the screen display.

The processing circuit may receive inputs associated with the trigger, sensors, joystick, and the various buttons. The processing circuit may process the inputs to update the user interface being displayed on the screen display. The processing circuit may receive the inputs as a result of an operator using the game console and pressing one of the various buttons, repositioning the joystick, maneuvering (e.g., moving) the game console so the sensors detect the movement, or pulling the trigger. The processing circuit may associate the inputs of each of the various buttons, sensors, and/or the trigger with a different action or signal to adjust the user interface on the screen display. For example, the processing circuit may identify a signal associated with an operator pulling the trigger as an indication to shoot a gun in a video game. While processing the same video game, the processing circuit may associate a signal from the various sensors indicating that the game console is being maneuvered as an indication to change the user interface from a first view to a second view. The processing circuit may process games or applications to create a virtual environment (e.g., an environment with multiple views) that operators can view by maneuvering the game console (e.g., spinning the game console around 360 degrees).

The screen display may also receive a data stream from an external device (e.g., another video game console). The external device may process an application or video game on a processing circuit of the external device to generate the data stream. The data stream may include audiovisual data. In some embodiments, the external device may transmit the data stream to the processing circuit of the game console to process and display on the screen display. An operator using the game console and/or viewing the display may press a button, pull the trigger, or maneuver the game console upon viewing the screen display. The game console may send the inputs generated by any of these interactions to the external device. The external device may process the inputs with the processing circuit of the external device and transmit an updated data stream to the game console for the screen display to display. The processing circuit of the external device may generate the updated data stream based on the inputs. Accordingly, the processing circuit of the game console may not need to perform any processing steps for the screen display to display the user interface.

Advantageously, the present disclosure describes a game console that allows an operator to be immersed in a gaming experience without an external display (e.g., a television). Because the screen display of the game console is coupled to an external component of the game console housing and can display a user interface that changes views corresponding to movement of the game console, an operator may play games on the game console while feeling that they are a part of various gaming environments. Further, the game console may interface with other game consoles to provide virtual reality functionality to games of the game consoles that would otherwise only be playable on a stationary screen. Consequently, the game console provides operators with a virtual reality experience for games and/or applications that are being processed on either an external device or the game console itself.

Another advantage to the present disclosure is the game console provides a hand held virtual reality system that does not necessarily need to be connected to a head or other body part of a user. Instead, a user may easily grab the game console and immediately be immersed in the gaming environment. Further, the user can be immersed in the gaming environment while still viewing the user's surroundings in the real world. This allows the user to avoid hitting real-world objects while playing immersive games or application in a three-dimensional virtual world.

The present disclosure describes a game console including a processing circuit, a game console housing, a joystick, and a screen display. The processing circuit may be internally coupled to the game console housing. The screen display may be coupled to the game console housing via an external component (e.g., a screen holder). The processing circuit can communicate with the screen display to display a user interface on the screen display. The processing circuit can process various applications and/or games to display and update the user interface. The processing circuit can receive inputs from the joystick, various buttons, and/or detected movements of the game console housing. The processing circuit can update the user interface based on the inputs.

The present disclosure is also generally directed to a method for combining joystick signal data with position sensor signal data to update or otherwise adjust a user interface on a display. Implementations not including the systems and methods described herein that attempted to combine such data would often determine whether to use data from either the joystick or the position sensor to update the user interface without being able to combine the two signals or providing a method for doing so. For example, in one such implementation, a signal from a joystick may override a signal from a position sensor when operating a gaming console. Consequently, the gaming console would be limited in the number and/or types of inputs it could handle when processing or executing games or applications.

Advantageously, the present disclosure describes a dynamic method for combining joystick data with position sensor data as an operator operates a game console. A processing circuit performing the method may receive a joystick signal and a position sensor signal, assign weights to the two signals, and combine the two weighted signals (e.g., using various operations such as aggregation, multiplication, averaging, etc.) to generate a third signal to update a user interface. The processing circuit may assign weights to the signals based on an application that the processing circuit or another processing circuit is processing and dynamically adjust the weights based on a current state of the application or based on values of the joystick signal and/or the position sensor signal. Consequently, the game console may process joystick signals and position signals without one of the signals taking over the other.

The present disclosure is also generally directed to a portable gaming device that enables a user to access applications or games that implement the joystick and position sensors as in the method described above. Implementations of gaming consoles or devices not utilizing the systems and methods described herein fail to combine a joystick with a blaster-shaped housing in a manner that allows the user to both control the user interface by maneuvering the gaming console and maneuvering the joystick. Consequently, such implementations have not enabled users playing first-person shooting games to have fine control of the user interface while still enabling the user to quickly scan a three-dimensional virtual environment.

Advantageously, the present disclosure describes a gaming console with a joystick positioned on an elongated portion (e.g., a barrel) of a blaster-shaped housing that enables a user handling the gaming console to both finely control a user interface with the joystick and quickly scan a three-dimensional virtual environment by maneuvering the gaming console. The joystick may be positioned so the user may both hold the elongated portion and maneuver the joystick with their thumb while still being able to press buttons located on one or multiple sides of the elongated portion of the blaster. Consequently, the user may more easily access and/or play games or applications being processed on the gaming console using the joystick and/or by repositioning the gaming console.

The present disclosure is also generally directed to a gaming console that uses different wireless communication interfaces and communication protocols to update or otherwise render a media stream on a display. Implementations of gaming consoles and devices not incorporating the systems and methods discussed herein may utilize a single communication channel that allows a controller to send data such as inputs to the controller to the gaming consoles and receive data from the gaming consoles that the gaming consoles generates based on such inputs. In such implementations, the controller and the gaming consoles may use the same communication channel and communication protocol for such data transmission, making it difficult for a console to efficiently handle transmission of different types of data such as data generated from position sensors and image data. For example, such communications channels and protocols may be better adapted to one type of data (e.g. low-latency command or control data) or another type of data (e.g. high-bandwidth isochronous multimedia data).

Advantageously, the present disclosure describes a gaming console that interfaces with a remote device to process a game or application. The gaming console may interface with the remote device over two communication interfaces. The first communication interface may be dedicated to input signals (e.g., position sensor signals, button signals, joystick signals, etc.). The first communication interface may allow for such input signals to be accurately transmitted to the remote device. The second communication interface may be dedicated to transmitting image data. For example, the remote device may transmit image data to the gaming console in response to receiving an input through the first communication interface. The first communication interface may provide for a lossless transport layer communication protocol while the second communication interface may provide for a lossy transport layer communication protocol. Accordingly, input signals may be accurately transmitted to the remote device for processing and the remote device may transmit image data back to the console device that may quickly be displayed on a user interface of the console device. Consequently, a game or application may be processed on a remote device while control of the game or application and a display of the game or application may be displayed on the gaming console with low latency.

Referring now to FIG. 1, a block diagram of a gaming environment 100 is shown, in accordance with some embodiments of the present disclosure. Gaming environment 100 is shown to include a game console 102, a display device 106, a network 108, and a remote device 110, in some embodiments. As described herein, gaming environment 100 may be a portable gaming system. Game console 102 may communicate with remote device 110 over network 108. Display device 106 may be a part of (e.g., coupled to an exterior component of) game console 102. In some embodiments, display device 106 may be a mobile device (e.g., a cell phone coupled to a housing of game console 102). A processing circuit 104 of game console 102 may communicate with display device 106 to display a user interface at display device 106. Game console 102 may process and display an application or game via processing circuit 104 and display device 106, respectively. As described herein, game console 102 may be a portable gaming device. In brief overview, game console 102 may display a list of games or applications to be played or downloaded on display device 106. An operator may select a game or application from the list by moving game console 102 and pressing an input button of game console 102. Game console 102 may display the selected game or application at display device 106. The operator may control movements and actions of the game or application by maneuvering and/or pressing input buttons of game console 102. Because display device 106 is a part of or is otherwise coupled to game console 102, display device 106 may move with the movements of game console 102. In some embodiments, game console 102 may display movements and/or actions that are associated with applications and/or games that remote device 110 is processing.

Network 108 may include any element or system that enables communication between game console 102 and remote device 110 and their components therein. Network 108 may connect the components through a network interface and/or through various methods of communication, such as, but not limited to, a cellular network, Internet, Wi-Fi, telephone, Lan-connections, Bluetooth, HDMI, or any other network or device that allows devices to communicate with each other. In some instances, network 108 may include servers or processors that facilitate communications between the components of gaming environment 100.

Game console 102 may be a game console including processing circuit 104, which can process various applications and/or games. Game console 102 may include display device 106, which is coupled to an exterior component (e.g., a screen holder) of a housing of game console 102. Processing circuit 104 may display an output of the applications and/or games that game console 102 processes at display device 106 for an operator to view. Game console 102 may also include various push buttons that an operator can press to send a signal to processing circuit 104. The signal may indicate that one of the push buttons was pressed. Each push button may be associated with an action or movement of the application or game that processing circuit 104 is processing. Further, processing circuit 104 may receive inputs from sensors of game console 102 that detect various aspects of movement (e.g., velocity, position, acceleration, etc.) associated with game console 102. Processing circuit 104 may use the inputs from the sensors to affect movements and/or actions associated with the games or applications that processing circuit 104 is processing. Processing circuit 104 may generate and/or update user interfaces associated with the games and/or applications being displayed on display device 106 based on the inputs.

Display device 106 may include a screen (e.g., a display) that displays user interfaces associated with games and/or applications being processed by processing circuit 104. Display device 106 may be coupled to game console 102 via a screen holder (not shown) attached to a game console housing (also not shown) of game console 102. Display device 106 may include a screen display which displays the user interfaces. In some embodiments, display device 106 may include a touchscreen. In some embodiments, display device 106 is a mobile device (e.g., a smartphone, a tablet, etc.), with a processor for processing or executing games or applications.

In some embodiments, display device 106 may display games and/or applications being processed by another device outside of game console 102 (e.g., remote device 110). Remote device 110 may be a device designed to process applications and/or games. Remote device 110 is shown to include a processing circuit 112. Processing circuit 112 may process the games and/or applications and send a user interface to display device 106 to be displayed. Processing circuit 112 may receive and process signals sent from processing circuit 104. Processing circuit 112 may update the user interface being displayed at display device 106 of game console 102 based on the signals from processing circuit 104. Processing circuit 112 may communicate with processing circuit 104 over network 108 via Bluetooth. Further, processing circuit 112 may communicate with display device 106 via an HDMI connection such as a wireless HDMI connection (e.g., HDbitT®, WiFi, HDMI wireless, etc.) or a wired HDMI connection (e.g., HDbaseT®).

Figure 2A:
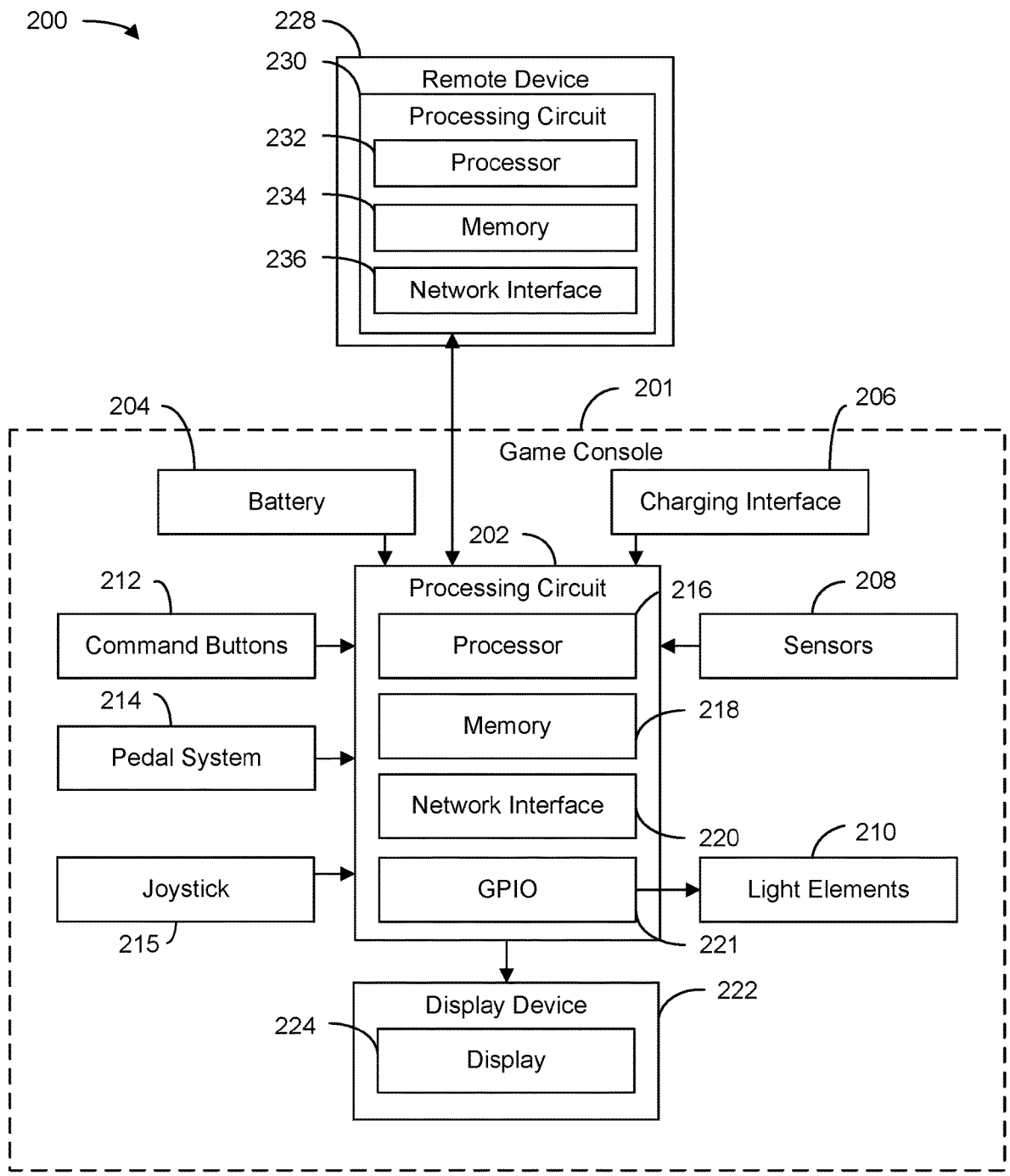
FIG. 2A is a block diagram of an exemplary embodiment of the gaming environment of FIG. 1, in accordance with some embodiments of the present disclosure.

Referring now to FIG. 2A, a block diagram of a gaming environment 200 is shown, in some embodiments. Gaming environment 200 may be an exemplary embodiment of gaming environment 100, shown and described with reference to FIG. 1, in some embodiments. Gaming environment 200 is shown to include a game console 201 and a remote device 228. Game console 201 may be similar to game console 102, shown and described with reference to FIG. 1. Remote device 228 may be similar to remote device 110, shown and described with reference to FIG. 1. Game console 201 is shown to include a processing circuit 202, a battery 204, a charging interface 206, sensors 208, light element(s) 210, command buttons 212, a pedal system 214, joystick 215, and a display device 222. As described above, display device 222 may be coupled to an exterior component (e.g., via a display holder on a barrel) of game console 201. Processing circuit 202 may receive inputs from each of components 204-214, process the inputs, and display and update an output at display device 222 based on the inputs. In some embodiments, processing circuit 202 may additionally or alternatively be a part of display device 222.

Game console 201 may include a battery 204. Battery 204 may represent any power source that can provide power to game console 201. Example of power sources include, but are not limited to, lithium batteries, rechargeable batteries, wall plug-ins to a circuit, etc. Battery 204 may be charged via charging interface 206. For example, battery 204 may be a rechargeable battery. To charge battery 204, an operator may connect game console 201 to a wall outlet via charging interface 206. Once game console 201 has finished charging, the operator may disconnect game console 201 from the wall outlet and operate game console 201 with the power stored in the rechargeable battery. The operator may disconnect game console 201 from the wall outlet at any time to operate game console 201. In some cases, the operator may operate game console 201 while it is connected to the wall outlet. Battery 204 may provide power to processing circuit 202 so processing circuit 202 may operate to process applications and/or games.

For example, as shown in FIG. 2A, processing circuit 202 includes a processor 216, memory 218, a communication device (e.g., a receiver, a transmitter, a transceiver, etc.), shown as network interface 220, and a general purpose input/output (GPIO) unit 221, in some embodiments. Processing circuit 202 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. Processor 216 may include an ASIC, one or more FPGAs, a DSP, circuits containing one or more processing components, circuitry for supporting a microprocessor, a group of processing components, or other suitable electronic processing components. In some embodiments, processor 216 may execute computer code stored in the memory 218 to facilitate the activities described herein. Memory 218 may be any volatile or non-volatile computer-readable storage medium capable of storing data or computer code relating to the activities. According to an exemplary embodiment, memory 218 may include computer code modules (e.g., executable code, object code, source code, script code, machine code, etc.) for execution by processor 216. GPIO unit 221 may include internal circuitry with one or more outputs that enable processor 216 to control and/or power light elements 210 and any other peripheral component. For example, GPIO unit 221 may comprise an input serial interface and convert serial data into signals provided to one or more solid state or analog relays enabling or disabling light elements 210. Such serial data may be obtained from an application executed by processor 216 (e.g. such as a value of a variable representing a player's life or ammunition or other such data), a remote application executed by a remote computing device, or any other component or remote device.

In some embodiments, processing circuit 202 may selectively engage, selectively disengage, control, and/or otherwise communicate with the other components of game console 201. As shown in FIG. 2, network interface 220 may couple processing circuit 202 to display device 222 and/or an external device (e.g., remote device 110). In other embodiments, processing circuit 202 may be coupled to more or fewer components. For example, processing circuit 202 may send and/or receive signals from the components of game console 201 such as light elements 210; charging interface 206; battery 204; command buttons 212 (e.g., a power button, input buttons, a trigger, etc.); one or more sensors, shown as sensors 208; pedal system 214 (including position detectors indicating a position of pedals of pedal system 214); and/or joystick 215 via network interface 220.

Processing circuit 202 may send signals to display device 222 to display a user interface on a display 224 of display device 222 via network interface 220. Network interface 220 may utilize various wired communication protocols and/or short-range wireless communication protocols (e.g., Bluetooth, near field communication ("NFC"), HDMI, RFID, ZigBee, Wi-Fi, etc.) to facilitate communication with the various components of game console 201, including display device 222, and/or remote device 228. In some embodiments, processing circuit 202 may be internally coupled to display device 222 via a tethered HDMI cable located inside a housing of game console 201 that runs between processing circuit 202 and display device 222. In some embodiments, processing circuit 202 may be connected to display device 222 via HDbitT®, which is described below. In some embodiments, processing circuit 202 may be connected to display device 222 via an HDMI low latency wireless transmission technology. Advantageously, by using an HDMI low latency wireless transmission technology, display device 222 may connect to both external devices and to processing circuit 202.

According to an exemplary embodiment, processing circuit 202 may receive inputs from various command buttons 212, pedal system 214, and/or joystick 215 that are located on an exterior surface of game console 201. Examples of command buttons 212 include, but are not limited to, a power button, input buttons, a trigger, etc. Pedal system 214 may include multiple pedals (input buttons) that are coupled to each other so only one pedal may be pressed at a time. In some embodiments, the pedals may be pressed to varying degrees. Processing circuit 202 may receive an input when an operator presses on a pedal of pedal system 214 and identify how much the operator pressed on the pedal based on data detected by sensors coupled to the pedal. Processing circuit 202 may receive the inputs and interpret and implement them to perform an action associated with a game or application that processing circuit 202 is currently processing.

Further, a user may provide an input to processing circuit 202 by maneuvering joystick 215 (e.g., moving the joystick from a first position to a second position). Joystick 215 may be an input device that attaches to game console 201 via one point of contact and pivots around the one point of contact. Joystick 215 may be a 2-axis or 3-axis joystick. Although referred to generally as a joystick, in some implementations, joystick 215 may comprise a directional pad (e.g. 4- or 8-directional pad over a corresponding 4 or 8 contact switches). Joystick 215 may have a resting position at which it does not generate a signal or otherwise generates a signal indicating that it has not been moved. When a user pivots joystick 215, joystick 215 may sense the movement and generate a signal indicating its angle compared to its resting position or game console 201. In some embodiments, joystick 215 may generate a signal indicating a magnitude of its position or its change in position and/or a direction at which it has been moved. In some embodiments, to avoid drift during gameplay, joystick 215 only generates a signal indicating a change in position when a user pivots joystick 215 beyond a threshold amount (e.g. allowing for a "dead zone" or area in which minor manipulation of the joystick or mechanical sagging of the joystick does not trigger a change in position or transmission of a signal). In other embodiments, joystick 215 may generate and/or transmit the signal regardless of whether the user pivoted joystick 215 beyond the threshold amount and processing circuit 202 uses a similar threshold to determine whether to use the joystick signal to update a user interface or to otherwise determine a weight to give the joystick signal when aggregating the joystick signal with a position sensor signal.

In some embodiments, joystick 215 may be depressible or incorporate a contact switch activated by pressing on the joystick. A user may press joystick 215 and joystick 215 may consequently transmit a signal to processor processing circuit 202 indicating that joystick 215 has been pressed. In some embodiments, the signal indicating that joystick 215 has been pressed may correspond to a predetermined command. The predetermined command may be individually associated with a game or application. For example, in a first-person shooting game, a user may press on joystick 215 to crouch or zoom in on a scope, in some embodiments. Pressing on joystick 215 may be associated with any predetermined command. In some embodiments, pressing on joystick 215 may cause weights that are associated with a joystick signal or a position sensor signal to adjust, as described below. Pressing on joystick 215 may cause the weights to adjust based on a change in the user interface, a change in state of a game or application being executed, or otherwise based solely on the joystick being pressed.

In some embodiments, processing circuit 202 may combine signals from sensors 208 and joystick 215 to update a display (e.g., a user interface) of display 224. Processing circuit 202 may combine the signal from sensors 208 and joystick 215 by assigning weights to each signal and aggregating, averaging, or performing some other operation or combination of operations on the weighted signals. For example, processing circuit 202 may determine that a joystick signal has a smaller weight than a position sensor signal so joystick 215 may be used for fine control of a user interface while a user may re-orient game console 201 for larger user interface adjustments. For instance, when a user is playing a first-person shooter game, the user may reorient game console 201 to scan a three-dimensional virtual environment and use joystick 215 to hone in a target within the three-dimensional virtual environment.

Processing circuit 202 may change a display (e.g., a user interface) of display 224 based on the inputs. The inputs from the input buttons, the trigger, and/or the pedal system may be an indication that the operator of game console 201 desires that their character in a game jumps, crouches, dives/slides, throws a knife, throws a grenade, switches weapons, shoots a weapon, moves backward, moves forward, walks, jogs, runs, sprints, etc. The inputs from the input buttons, the trigger, and/or the pedal system may additionally or alternatively be an indication that the operator of game console 201 desires to perform various different actions while in menus of the game such as scroll up, scroll down, and/or make a menu selection (e.g., select a map, select a character, select a weapon or weapons package, select a game type, etc.). In this way, an operator may utilize game console 201 as a mouse or roller ball that can move a cursor on display 224 to select an option that display 224 displays. Inputs from the power button may be an indication that the operator of game console 201 desires that game console 201 be turned on or off.

In some embodiments, an operator may calibrate game console 201 to adjust a rate of change of views of display 224 versus movement that sensors 208 detects. For example, game console 201 may be configured to change views of display 224 at a same rate that an operator moves game console 201. The operator may wish for the views to change at a slower rate. Accordingly, the operator may adjust the settings of game console 201 so display 224 changes views slower than the operator moves game console 201.

In some embodiments, an operator may calibrate game console 201 based on the actions being performed on a user interface. For example, an operator may calibrate game console 201 so the user interface changes at the same rate that the operator moves game console 201 when playing a game. Within the same configuration, the operator may also calibrate game console 201 so the operator can maneuver a cursor at a faster rate than the operator moves game console

201 when selecting from a drop down menu or from other types of menus or option interfaces.

In some embodiments, processing circuit 202 may receive an indication regarding a characteristic within a game (e.g., a health status of a character of the game) operated by game console 201 and control light elements 210 of a light bar (not shown) to provide a visual indication of the characteristic within the game operated by game console 201. For example, processing circuit 202 may receive an indication regarding a health status of a character within the game that is associated with the operator of game console 201 and control light elements 210 (e.g., selectively illuminate one or more of light elements 210, etc.) to provide a visual indication of the character's health via the light bar. By way of another example, processing circuit 202 may receive an indication regarding a number of lives remaining for a character within the game that is associated with the operator of game console 201 and control light elements 210 (e.g., selectively illuminate one or more of light elements 210, etc.) to provide a visual indication of the number of remaining lives via the light bar. In another example, processing circuit 202 may receive an indication regarding a hazard or event within the game (e.g., radiation, warning, danger, boss level, level up, etc.) and control light elements 210 to change to a designated color (e.g., green, red, blue, etc.) or to flash to provide a visual indication of the type of hazard or event within the game via the light bar.

In some embodiments, processing circuit 202 may receive inputs from sensors 208 of game console 201. Sensors 208 may include an accelerometer, a gyroscope, and/or other suitable motion sensors or position sensors that detect the spatial orientation and/or movement of game console 201 (e.g., a magnetometer). The accelerometer and gyroscope may be a component of an inertial measurement unit (not shown). The inertial measurement unit may include any number of accelerometers, gyroscopes, and/or magnetometers to detect the spatial orientation and/or movement of game console 201. The inertial measurement unit (IMU) may detect the spatial orientation and/or movement of game console 201 by detecting the spatial orientation and/or movement of a game console housing (not shown) of game console 201. The IMU may transmit data identifying the spatial orientation and/or movement of game console 201 to processing circuit 202. Based on signals received from sensors 208, processing circuit 202 may adjust the display provided by display 224 of display device 222. For example, sensors 208 may detect when game console 201 is pointed up, pointed down, turned to the left, turned to the right, etc. Processing circuit 202 may adaptively adjust the display on display 224 to correspond with the movement of game console 201.

In some embodiments, game console 201 may include speakers (not shown). Processing circuit 202 may transmit audio signals to the speakers corresponding to inputs that processing circuit 202 processes while processing a game and/or application. The audio signals may be associated with the game or application. For example, an operator may be playing a shooting game that processing circuit 202 processes. The operator may pull the trigger of game console 201 to fire a gun of the shooting game. Processing circuit 202 may transmit a signal to the speakers to emit a sound associated with a gun firing.

In some embodiments, game console 201 may be used as a mouse and/or keyboard to interact with various dropdown menus and selection lists being displayed via display device 222. In some cases, the various dropdown menus and selection lists may be related to an online exchange that allows operators to select a game or application to download into memory 218 of processing circuit 202. The operators may select the game or application by reorienting game console 201 to move a cursor that display device 222 is displaying on a user interface including dropdown menus and/or selection lists. Sensors 208 of game console 201 may detect the movements of game console 201 and send signals to processing circuit 202 that are indicative of the movements including at least movement direction and/or speed. Processing circuit 202 may receive and process the signals to determine how to move the cursor that display device 222 is displaying. Processing circuit 202 may move the cursor corresponding to the movement of the game console 201. For example, in some instances, if an operator points game console 201 upward, processing circuit 202 may move the cursor upwards. If an operator points game console 201 downward, processing circuit 202 may move the cursor downwards. The operator may configure game console 201 to invert the movements or change the movements in any manner to affect the movement of the cursor. In some embodiments, processing circuit 202 may receive inputs that correspond to the movement and the speed of the movement of game console 201 based on the movement of an end of the barrel of game console 201.

In some embodiments, game console 201 may include a calibrated floor position that movements of game console 201 may be detected against. An administrator may calibrate the floor position by setting a base position of the gyroscopes of game console 201 that are associated with a pitch of game console 201. The pitch of game console 201 may be determined based on the position of game console 201 relative to the calibrated floor position. For example, an administrator may calibrate a floor position of game console 201 to be when game console 201 is positioned parallel with the ground. The administrator may position and/or determine when game console 201 is parallel with the ground and set the gyroscope readings associated with the pitch of the position as a calibrated floor position. If the gyroscopes detect that game console 201 is pointing at a position above the calibrated floor position, the gyroscopes may send data indicating the position of game console 201 as pointing up and/or a degree of how far up console 201 is pointing relative to the calibrated floor position to processing circuit 202.

In some embodiments, the gyroscopes may send position data to processing circuit 202 and processing circuit 202 may determine the position of game console 201 compared to the calibrated floor position. Consequently, processing circuit 202 may determine a pitch position of game console 201 relative to a consistent fixed pitch position instead of relative to a starting pitch position of game console 201 upon start-up of a game or application. Advantageously, an administrator may only set a calibrated floor position for the pitch of game console 201. Processing circuit 202 may determine and set a calibrated yaw position of game console 201 upon boot up or upon starting processing of a game or application. A user playing the game or application may adjust the calibrated floor position and/or calibrated yaw position by accessing the settings associated with the game, application, or game console 201.

The gyroscopic data may include pitch, yaw, and/or roll of game console 201. The pitch may correspond to the barrel of game console 201 moving up or down and/or a position on a y-axis (e.g., a y-axis tilt of game console 201). The yaw may correspond to the barrel of game console 201 moving side-to-side and/or a position on an x-axis (e.g., an x-axis tilt of game console 201). The roll may correspond to the barrel rotating clockwise or counterclockwise around a z-axis. The y-axis may point from the ground to the sky, the x-axis may be perpendicular to the y-axis, and the z-axis may be an axis extending from an end (e.g., the barrel or the handle) of game console 201. Gyroscopes of the IMU may be positioned to detect the pitch, yaw, and/or roll of game console 201 as gyroscopic data along with a direction of each of these components. The gyroscopes may transmit the gyroscopic data to processing circuit 202 to indicate how game console 201 is moving and/or rotating.

Processing circuit 202 may move a cursor on a user interface by analyzing gyroscopic data that gyroscopes of game console 201 send to processing circuit 202 along with other positional data (e.g., acceleration data from accelerometers). Processing circuit 202 may process the gyroscopic data to convert it into mouse data. Based on the mouse data, processing circuit 202 can move a cursor on the user interface accordingly. For example, if a detected pitch indicates game console 201 is pointing up, processing circuit 202 may move a cursor up. If a detected yaw indicates game console 201 is pointing left, processing circuit 202 may move the cursor left. Consequently, the combination of processing circuit 202 and the gyroscopes can act as an HID-compliant mouse that can detect a movement of game console 201 and move a cursor of a user interface corresponding to the movement. Further, processing circuit 202 may send such gyroscopic data to another device (e.g., remote device 228) for similar processing. Advantageously, by acting as an HID-compliant mouse, game console 201 can move cursors associated with various games and application according to a set standard. Game and application manufacturers may not need to create their games or applications to specifically operate on processing circuit 202.

Processing circuit 202 may also use gyroscopic data (in combination with other data such as data from one or more accelerometers) of game console 201 to act as an HID-compliant joystick. When processing a game with a user interface emulating a view of a person in a three-dimensional environment, processing circuit 202 may receive gyroscopic data associated with the pitch, yaw, and/or roll of game console 201 compared to a calibrated floor position as described above. Processing circuit 202 may convert the gyroscopic data and accelerometer data to HID-compliant joystick data associated with a direction and acceleration of movement of game console 201. Based on the direction and acceleration, processing circuit 202 may update the user interface.

For example, processing circuit 202 may process a three-dimensional environment of a game or application. Processing circuit 202 may receive gyroscopic data indicating that game console 201 is pointing up relative to a calibrated pitch position and convert the data to HID-compliant joystick data. Based on the HID-compliant joystick data, processing circuit 202 may update the user interface to cause a character of the game or application to look up in the three-dimensional environment (e.g., reorient the screen to look up in the three-dimensional environment) or move a cursor up in the three-dimensional environment. Processing circuit 202 may also receive gyroscopic data indicating a roll of game console 201. A roll may correspond to an action in a game or application. For example, an operator may roll game console 201 to peak around a corner in a game.

Various positions of game console 201 may correspond to actions in a game. For example, gyroscopic data may indicate that game console 201 is pointing down. Such a movement may be associated with reloading in a game. Processing circuit 202 may receive this data, convert the data to HID-compliant joystick data, and update the user interface so a reload animation is performed. Game console 201 may associate various motion gestures with various actions depending on the game or application that game console 201 is processing.

In some embodiments, display device 222 may operate as a digital keyboard. Display device 222 may present a digital keyboard at display 224 and an operator may interact with the digital keyboard to select various keys. The operator may select various keys by moving a cursor as discussed above and pressing a button or pulling the trigger of game console 201. In some embodiments, display device 222 may include a touchscreen. In these embodiments, an operator may physically touch an electronic representation of each key on display 224 of display device 222 to select keys of the digital keyboard.

In some embodiments, game console 201 may generate a virtual environment for an operator to view. Game console 201 may generate the virtual environment based on a game or application that processing circuit 202 processes. Processing circuit 202 may generate the virtual environment by processing software associated with the game or application. The virtual environment may be a three-dimensional environment that an operator can interact with by providing various inputs into game console 201. A portion of the virtual environment may be displayed by display device 222. An operator that is operating game console 201 may change the portion of the virtual environment being displayed by display device 222 by providing an input into game console 201. Processing circuit 202 may receive the input and update the display of display device 222 based on the input. In some embodiments, processing circuit 202 can continue to generate and update views of the virtual environment that are not currently being displayed by display device 222. Advantageously, by continuing to generate and update portions of the environment that are not currently being shown by display device 222, if the operator provides an input to cause the display to change to another view of the environment, processing circuit 202 may not need to generate a new view responsive to the input. Instead, processing circuit 202 can display a view that processing circuit 202 has already generated. Consequently, processing circuit 202 may process the virtual environment faster after initially generating the virtual environment.

For example, an operator may be playing a war game simulator on game console 201. Processing circuit 202 of game console 201 may generate a three-dimensional battlefield associated with the war game. The three-dimensional battlefield may include terrain (e.g., bunkers, hills, tunnels, etc.) and various characters that interact with each other on the battlefield. The operator playing the war game can view a portion of the battlefield through display device 222. The portion of the battlefield may be representative of what a person would see if the battlefield was real and the person was on the battlefield. The operator may change views (e.g., change from a first view to a second view) of the battlefield by reorienting game console 201. For instance, if the operator spins 360 degrees, processing circuit 202 could display a 360-degree view of the battlefield on display device 222 as the operator spins. If the operator pulls the trigger of game console 201, a sequence associated with firing a gun may be displayed at display device 222. Further, if the operator presses on a pedal of pedal system 214, a character representation of the operator may move forward or backwards in the battlefield corresponding to the pedal that was pressed. Other examples of interactions may include the operator pressing an input button to select an item (e.g., a medical pack) on the battlefield, the operator pressing a second input button to reload, the operator pressing a third input button to bring up an inventory screen, etc. As described, by pressing an input button, the operator may change the state of the input button from an unpressed state to a pressed state. Similarly, by pulling the trigger, an operator may change the state of the trigger from an unpulled state to a pulled state. Further, a detected change in position of game console 201 may be described as a change in state of the position of game console 201.

Various buttons (e.g., command buttons 212) may map to different actions or interactions of games that processing circuit 202 processes. Different games may be associated with different button mappings. Further, the mappings may be customizable so an operator can control actions that each button is associated with. For example, a button in one game may be associated with a "jump" movement in the game. In another game, the same button may be associated with a "sprint" movement while another button of the various buttons may associated with the jump movement.

In some embodiments, the various buttons may each be associated with a letter or button on a keyboard displayed on a user interface. An operator may customize the buttons to be associated with different letters based on the operator's preferences. A keyboard may be displayed on display 224 and the operator may select keys of the keyboard using the various push buttons.

In some embodiments, game console 201 may operate as an input and display device for an external gaming device (e.g., remote device 228). For example, remote device 228 of gaming environment 200 may be in communication with processing circuit 202 of game console 201. Remote device 228 may include a processing circuit 230 having a processor 232, memory 234, and a network interface 236. Processing circuit 230, processor 232, memory 234, and network interface 236 may be similar to processing circuit 202, processor 216, memory 218, and network interface 220 of game console 201, respectively. In some cases, remote device 228 may include a plug-in that facilitates transmission of an HDMI output (e.g., an audiovisual data stream generated by processing circuit 230) to display device 222 or to processing circuit 202 to forward to display device 222. In some cases, remote device 228 may transmit audio data that corresponds to visual data that remote device 228 transmits. Consequently, remote device 228 may transmit audiovisual data streams to game console 201 to display at display device 222.

In some embodiments, processing circuit 202 of game console 201 may be or may include a Bluetooth processor including various Bluetooth chipsets. The Bluetooth processor may receive inputs from various components of game console 201, and send the inputs to processing circuit 230 for processing. Advantageously, Bluetooth processors may be physically smaller and require less processing power and/or memory than other processors because the Bluetooth processors may not need to process applications or games or produce an audiovisual data stream to display at display device 222. Instead, the Bluetooth processor may only receive and package inputs based on operator interactions with game console 201 and transmit the inputs to remote device 228 for processing. In addition to Bluetooth, other wireless protocols may utilized to transmit inputs to remote device 228. For example, processing circuit 202 may transmit the inputs to remote device 228 through infrared signals. The inputs may be transmitted through any type of wireless transmission technology.

In some embodiments, remote device 228 may transmit an HDMI output to display device 222 using HDbitT® technology. HDbitT® may enable transmission of 4K Ultra HD video, audio, Ethernet, power over Ethernet, various controls (e.g., RS232, IR, etc.) and various other digital signals over wired and/or wireless communication mediums. For example, HDbitT® may enable data transmission via UTP/STP Cat5/6/7, optical fiber cables, power lines, coaxial cables, and/or wireless transmission. Remote device 228 may receive inputs from game console 201 (e.g., via Bluetooth), process the inputs based on a game or application that remote device 228 is currently processing, and transmit an updated HDMI output (e.g., an updated audiovisual datastream) to display device 222 using HDbitT® technology. Advantageously, by using HDbitT® to transmit data streams, remote device 228 may wirelessly transmit high definition audiovisual data signals to display device 222 for users that are using game console 201 to view. HDbitT® may allow for remote device 228 to transmit high definition audiovisual data signals over large distances so users can use game console 201 far away from remote device 228 (e.g., 200 meters) or between rooms in a house. For example, operators may use game console 201 in various rooms of a house without moving remote device 228 between the rooms.

Remote device 228 may process games and/or applications. Remote device 228 may generate a user interface associated with the games or applications and send the user interface to processing circuit 202 or directly to display device 222. If remote device 228 sends the user interface to display device 222, display device 222 may display the user interface at display 224 and play any audio that remote device 228 sent to display device 222 via an audio component (e.g., one or more speakers) of game console 201. In some embodiments, a speaker of remote device 228 may play the audio via speakers connected to remote device 228 (e.g., speakers on a television connected to remote device 228).

In some instances, an operator operating game console 201 may view the user interface that remote device 228 generated and sent to display device 222. The operator may interact with the user interface by pressing input buttons (e.g., command buttons 212, pedal system 214, a trigger, etc.) of game console 201 or reorienting game console 201. Processing circuit 202 can receive the input signals generated from either action and transmit (e.g., forward) the inputs to processing circuit 230 of remote device 228. Processing circuit 202 may transmit the input signals to processing circuit 230 via Bluetooth, as described above. Remote device 228 may receive and process the input signals. Remote device 228 can consequently provide an updated user interface (e.g., an updated data stream that adjusts the user interface currently being displayed at display device 222) to game console 201 (e.g., via HDbitT®). Remote device 228 may either send the updated user interface directly to display device 222 to update the display of display 224 or to processing circuit 202 for processing circuit 202 to update the display. Advantageously, as described, game console 201 can connect to remote device 228 to display games and/or applications designed for remote device 228. Game console 201 can display the game or application on display device 222. An operator accessing game console 201 may play the games or applications by providing inputs via game console 201. Processing circuit 230 of remote device 228 may perform the processing functions of the games or applications so processing circuit 202 of game console 201 may not need to perform such functions or have the capability (e.g., processing power and/or memory requirements) to do so.

Figure 2B:
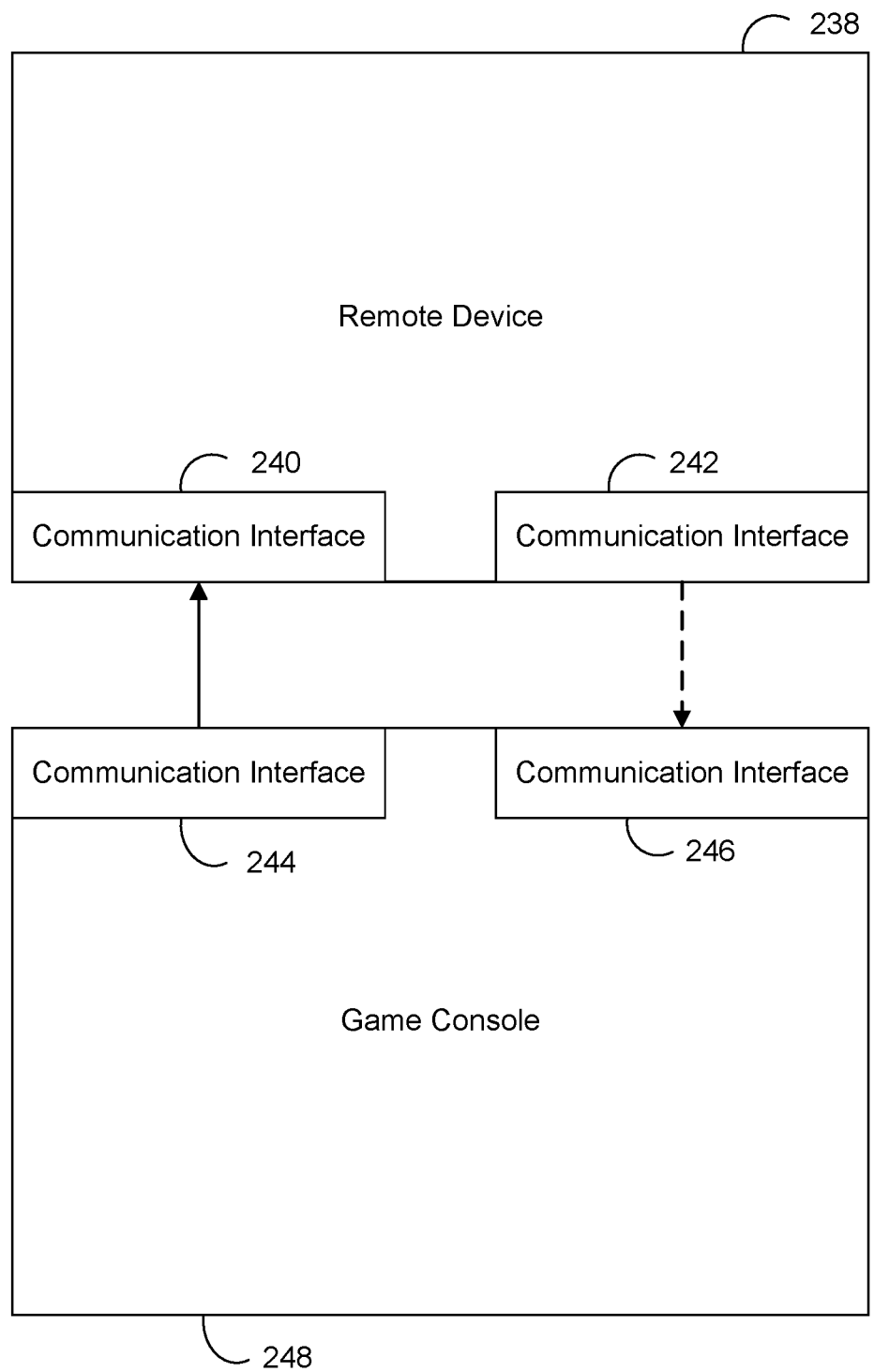
FIG. 2B is a block diagram of an exemplary embodiment of a game console in communication with a remote device via different communication interfaces, in accordance with some embodiments of the present disclosure.

FIG. 2B is a block diagram of an exemplary embodiment of a game console 248 in communication with a remote device 238 via different communication interfaces, in accordance with some embodiments of the present disclosure. Game console 248 may be similar to game console 201 and remote device 238 may be similar to remote device 228, both shown and described with reference to FIG. 2A. Game console 248 is shown to include a communication interface 244 and a communication interface 246. Remote device 238 is shown to include a communication interface 240 and a communication interface 242. In some embodiments, communication interfaces 244 and 246 may be a part of network interface 220 and communication interfaces 240 and 242 may be a part of network interface 236, both shown and described with reference to FIG. 2A. Communication interface 244 of game console 248 may generate and transmit input signals to communication interface 240. Examples of input signals may be signals generated resulting from a user pressing a push button, moving a joystick, pulling a trigger, pushing on a pedal, reorienting game console 248, or any other signal that may be generated resulting from a user action. Communication interface 244 may send the signal over Bluetooth, infrared, over a wired connection, or over any wireless LAN scheme in conformity with an IEEE 802.11 standard (e.g. 802.11a/b/g/n/ax/etc.). In some embodiments, communication interface 244 may utilize a lossless transport layer communication protocol to transmit such signals. The communication interface 244 may do so to ensure that the correct signals are being transmitted between the game console and the remote device. Correct signals may be important when transmitting inputs as any errors would prove to be frustrating to the user. For example, a user may not want to move a joystick in one direction while remote device 238 updates the user interface to move in the opposite direction. While lossless communications protocols require extra overhead for error correction, retransmissions, etc., control signals may be relatively low bandwidth and thus may still be transmitted quickly and with low effective latency. Communication interface 244 may transmit the input signal to communication interface 240 of remote device 238.

Remote device 238 may process the input signal from communication interface 244 according to the application or game that remote device 238 is executing. Remote device 238 may generate an updated audiovisual data stream (e.g., a media stream) based on the signal from communication interface 244 and transmit the updated audiovisual data stream to game console 248 through communication interface 242. Communication interface 242 may utilize WiFi, HdBitT®, HdBaseT®, a wired connection, or any wireless LAN scheme in conformity with an IEEE 802.11 standard to transmit the audiovisual data stream to game console 248. Communication interface 242 may transmit the audiovisual data stream to game console 248 using a different communication protocol than the communication protocol that communication interface 244 uses to transmit input data to remote device 238. In some embodiments, communication interface 242 may utilize a lossy transport layer communication protocol to transmit the audiovisual data to game console 248 to update a user interface. Audiovisual data may be both high-bandwidth (e.g. for high resolution images at very high numbers of frames per second, for example) and time-sensitive (e.g. where delays or lag may result in visuals becoming temporally unassociated with commands or controls, such that the view doesn't rotate with the player, actions are not shown until after a delay, etc.). Communication interface 242 may utilize a lossy transport layer communication protocol to ensure that a large file size that may accommodate audiovisual data may be transmitted to game console 248 quickly to update the user interface of game console 248.

Figure 2C:
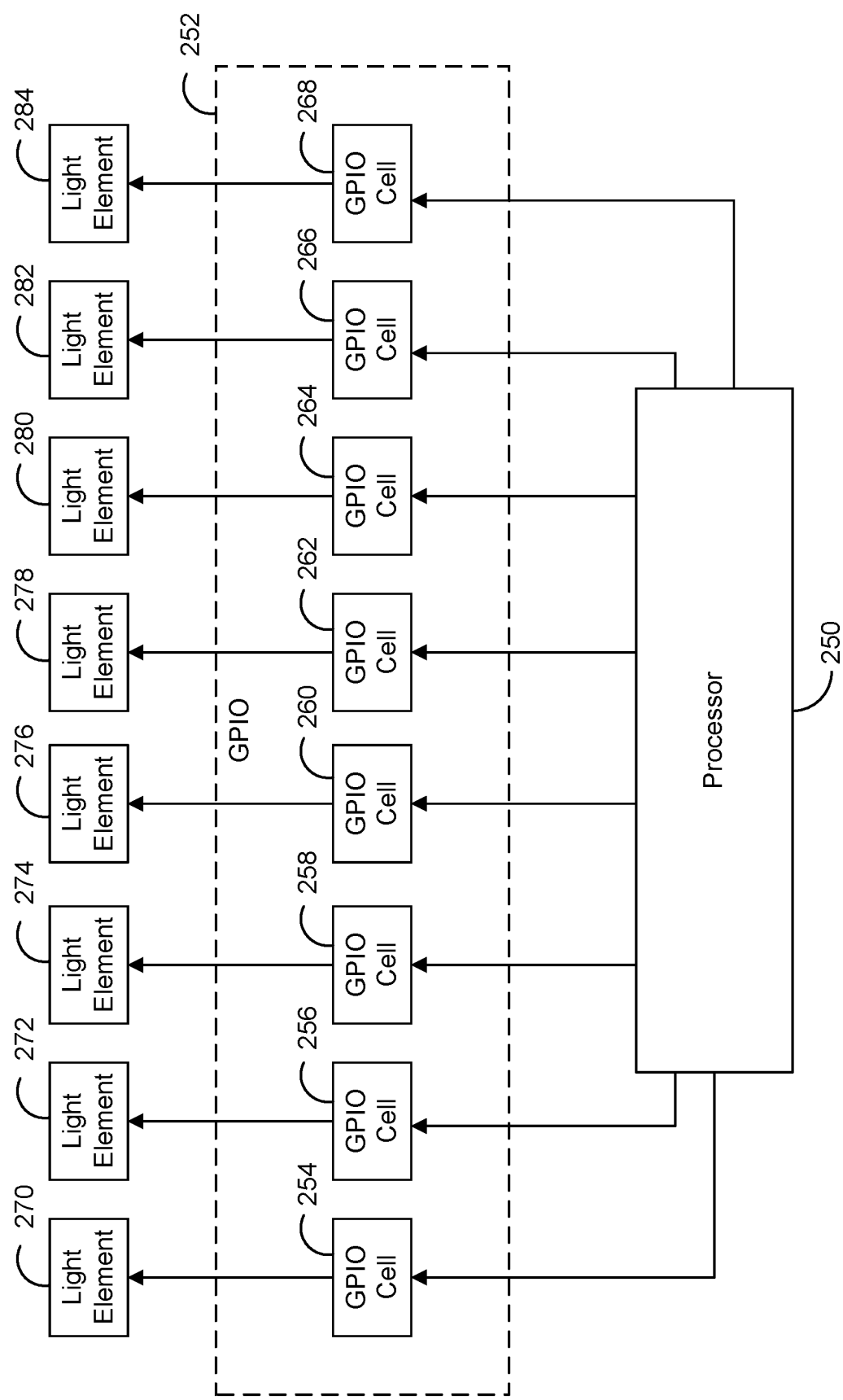
FIG. 2C is a block diagram of an exemplary embodiment of a processor in communication with a general purpose input/output (GPIO) unit to control light elements, in accordance with some embodiments of the present disclosure.

FIG. 2C is a block diagram of an exemplary embodiment of a processor 250 in communication with a general purpose input/output (GPIO) unit 252 to control light elements 270-284, in accordance with some embodiments of the present disclosure. Processor 250 may be similar to processor 216, shown and described with reference to FIG. 2A. GPIO unit 525 may be similar to GPIO unit 221, shown and described with reference to FIG. 2A. GPIO unit 252 may include GPIO cells 254-268. GPIO unit 252 may include more or less GPIO cells 254-268 depending on its configuration. Processor 250 is shown to be connected to each of GPIO cells 254-268. However, processor 250 may be connected to more or fewer of GPIO cells. Further, each of GPIO cells 254-268 may be connected to one or more light elements. GPIO cells 254-268 may be connected to other components of a blaster or may not be connected to any component. Light elements 270-284 may be similar to light elements 210, shown and described with reference to FIG. 2.

Processor 250 may control each or a portion of light elements 270-284 based on an application or game that processor 250 is processing. For example, processor 250 may cause all of light elements 270-284 to light up if the health of an in-game character is high or only a few of light elements 270-284 to light up if the health of the in-game character is low. In another example, a portion of light elements 270-284 may flash to represent that the in-game character got shot or was otherwise contacted. In yet another example, a portion of light elements 270-284 may light up to indicate an amount of ammo that an-game character has. In yet another example, a portion of light elements 270-284 may light up to indicate an in-game action such as a character talking, running, jumping, picking up an item, etc. In some embodiments, light elements 270-284 may light up to be different colors depending on the action and what light elements 270-284 represent in-game. For example, light elements 270-284 may light up to be red to represent health and light up white to represent ammo in the same game. In some embodiments, an operator could toggle between the colors to view different aspects of the game. Processor 250 may cause light elements 270-284 to light up in sequence (e.g., light elements 270-284 may light up next to each other until all of light elements 270-284 are lit) to indicate an aspect of a game or application being processed. Light elements 270-284 may light up in any order and in any pattern.

To control or light up light elements 270-284, processor 250 may transmit one or more signals to one or more of GPIO cells 254-268. A GPIO cell represents an input node and internal logic of GPIO 252 that is performed on any input received at the input node. In some embodiments, a GPIO cell represents an input node for receiving a signal from processor 250 and an output node for lighting up or otherwise powering one or more light elements. A GPIO cell may receive a signal from processor 250 and accordingly light up any of light elements 270-284. If more current is necessary to light up a light element, a GPIO cell may provide a signal to a driver to provide such current. In some embodiments, a GPIO cell may be configured to receive more than one signal from processor 250. In such embodiments, the GPIO cell may perform various processes to light up one or more lights elements based on a combination of the signals.

For example, processor 250 may identify a light pattern that corresponds to an in-game characteristic such as an amount of health that a character within the game has. Processor 250 may identify the light pattern from a database based on the in-game characteristic. Processor 250 may send a signal to one or more of GPIO cells 254-268 indicating the light pattern and one or more of the GPIO cells may light up a portion of light elements 270-284 according to the light pattern. Processor 250 may send any light pattern to GPIO cells 254-268.

Figure 3:
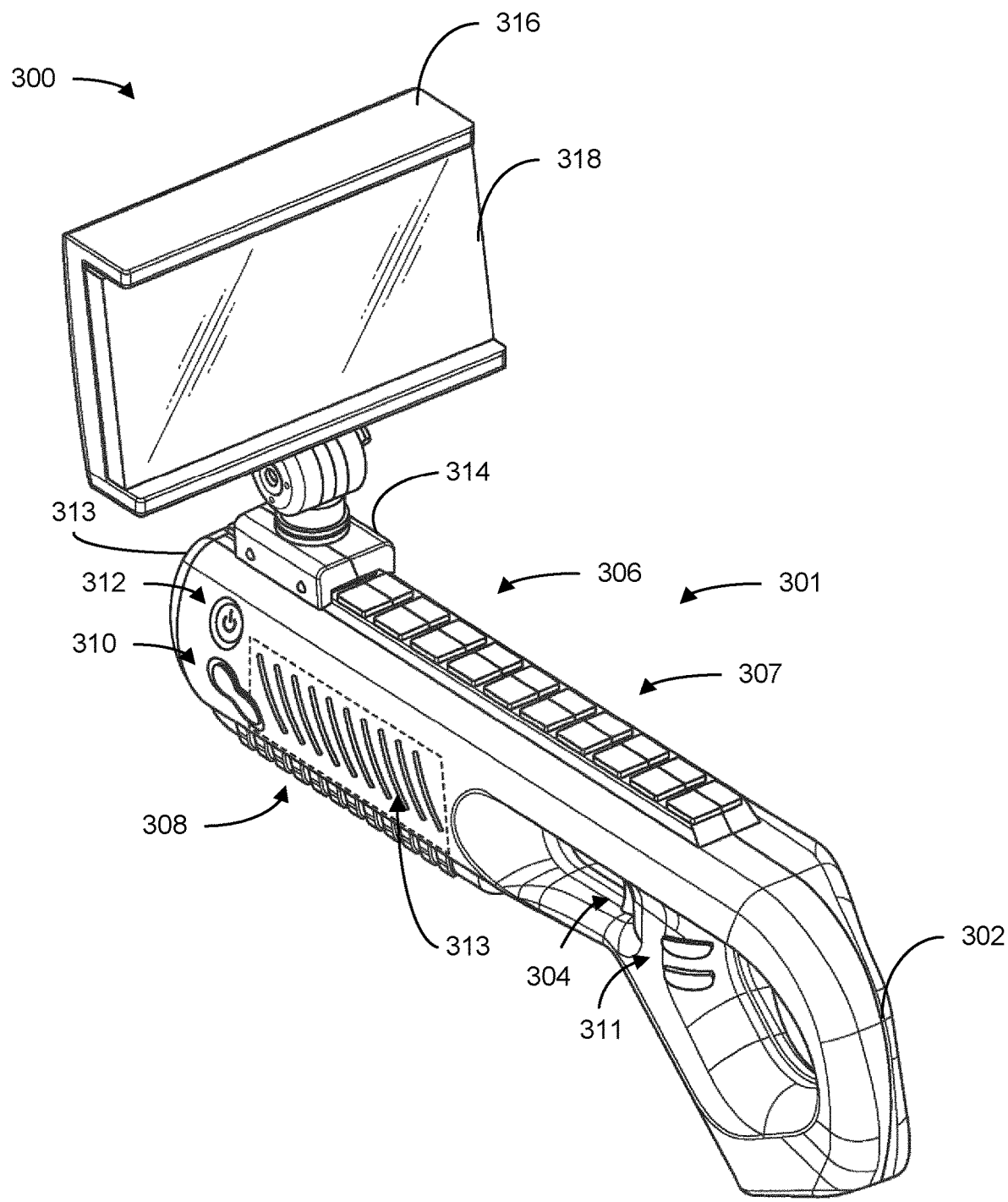
FIG. 3 is a perspective view of a game console including a display device coupled to a game console housing of the game console, in accordance with some embodiments of the present disclosure.

Referring now to FIG. 3, a perspective view of a game console 300 including a display device 316 coupled to a game console housing 301 via a screen holder 314 (e.g., an adjustable clamp or a component this a part of game console housing 301) is shown, in accordance with some embodiments of the present disclosure. Game console 300 may be similar to and include similar components to game console 201, shown and described with reference to FIG. 2. Display device 316 may be similar to display device 222, shown and described with reference to FIG. 2. Game console housing 301 is shown to include a grip portion 302, a trigger 304, an elongated portion 306 (e.g., a barrel), latches 307, a grip 308, command buttons 310 and 311, a power button 312, and light elements 313. Game console housing 301 may be made out of plastic, metal, wood, glass, or any other type of material. Game console housing 301 may be shaped to resemble a blaster device (e.g., a rifle, a shotgun, a machine gun, a grenade launcher, a rocket launcher, etc.). Elongated portion 306 may be shaped to resemble a barrel of such a blaster device (e.g., elongated portion 306 may be shaped like a tube and extend away from grip portion 302 and trigger 304). Screen holder 314 may be coupled to elongated portion 306 such that an operator holding game console 300 may view display device 316, which is attached to screen holder 314, when the operator is holding game console 300. Screen holder 314 may be coupled to a top of elongated portion 306. It should be understood that the positions and number of handles, triggers, barrels, latches, grips, command buttons, and light elements as shown and described with reference to FIG. 3 are meant to be exemplary. Game console housing 301 may include any number of handles, triggers, barrels, latches, grips, command buttons, and/or light elements and they can be in any position and in any size or orientation on game console housing 301. Further, screen holder 314 and display device 316 may be any shape or size and coupled to any component of game console housing 301 and are not meant to be limited by this disclosure.

Grip portion 302 may be a handle by which a user may grasp game console housing, and may comprise a portion extending orthogonally or at an angle from elongated portion 306 (e.g. downwards, when elongated portion 306 is horizontal). Grip portion 302 may be configured so the user can grasp game console 301 housing by wrapping the user's fingers around grip portion 302 until the fingers begin to point back at the user. For example, an operator may grasp grip portion 302 by forming a "U"-shape with their hand with grip portion 302 forced against the operator's fingers. Further, grip portion 302 may be configured so an operator may pull trigger 304 positioned away from the operator with the operator's index finger by pulling the operator's index finger towards the operator. Accordingly, grip portion 302 creates a handle that a user may hold similar to how the user would hold a blaster.

Figure 11:
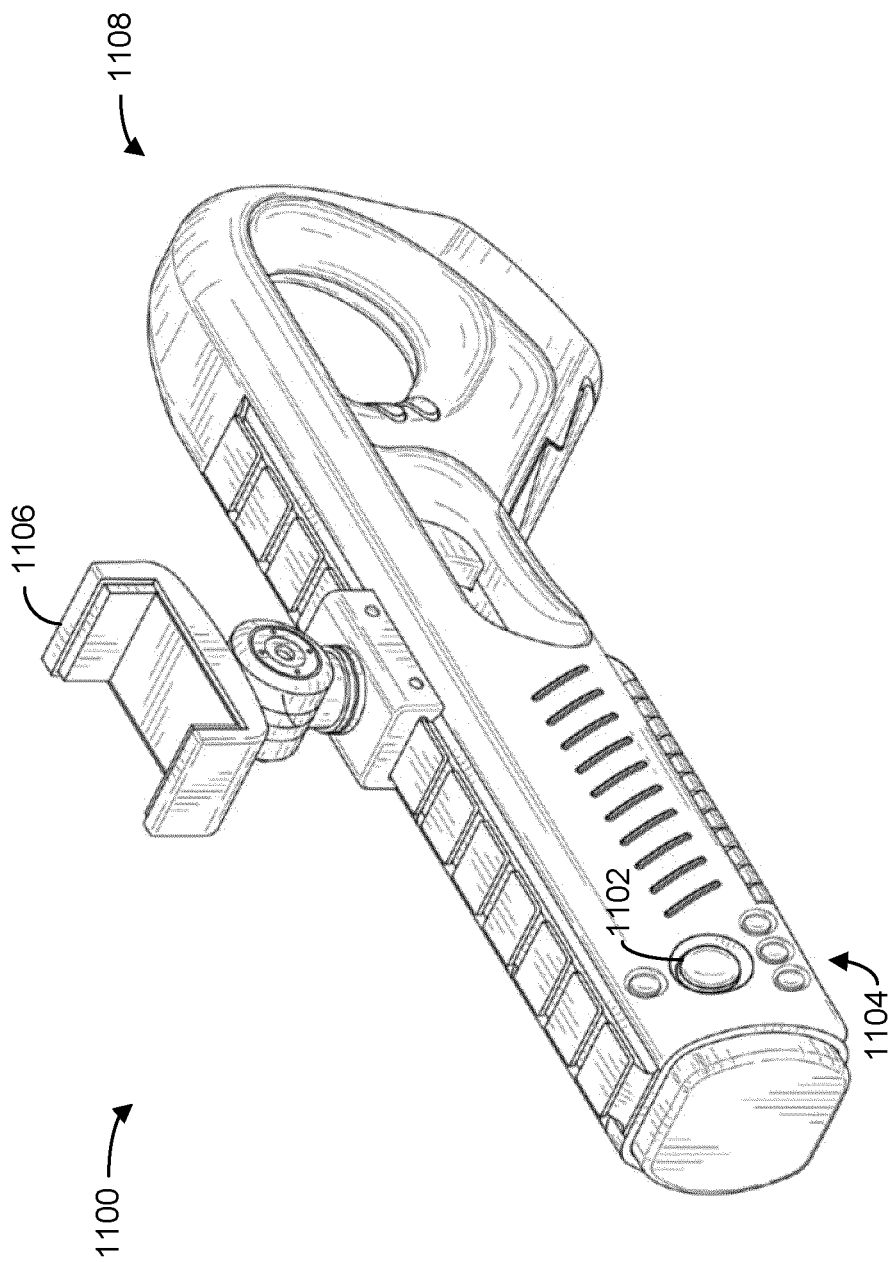
FIG. 11 is a perspective view of a game console including a screen holder coupled to a game console housing of the game console and a joystick, in accordance with some embodiments of the present disclosure.

Elongated portion 306 may be a portion of game console housing 301 that orthogonally extends from grip portion 302 or extends at an angle from grip portion (e.g. horizontally, when grip portion 302 is vertical or near vertical). Elongated portion 306 may be shaped similar to a barrel of a blaster and may be hollow or at least partially solid. An operator may hold grip 302 with a first hand and elongated portion 306 with a second hand. In some embodiments, as shown in FIG. 11, elongated portion may include a joystick positioned to be articulated by a thumb of the second hand. Elongated portion 306 may extend from trigger 304 which the operator may pull with their index finger. Additionally, elongated portion 306 may include buttons 310 on sides of a terminal end 313. Buttons 310 may be positioned to be pressed by fingers and/or thumbs of the second hand of the user while the user is holding game console housing 301. Buttons 310 may be positioned on one or opposing sides of elongated portion 306.

Game console 300 may also include a processing circuit (e.g., processing circuit 202) (not shown). The processing circuit may be internally coupled to game console housing 301. In some embodiments, the processing circuit may be insulated by protective components (e.g., components that prevent the processing circuit from moving relative to game console housing 301 or from being contacted by other components of game console 300) so the processing circuit may continue operating while operators are moving game console 300 to play a game and/or an application. Further, in some embodiments, the processing circuit may be coupled to display device 316. The processing circuit may be coupled to display device 316 via any communication interface such as, but not limited to, an HDMI cable, an HDMI low latency wireless transmission technology, HDbitT®, WiFi, etc. The processing circuit may generate and update a user interface being shown on display device 316 based on a game or application that the processing circuit is processing and/or inputs that the processing circuit processes, as described above with reference to FIG. 2.

Display device 316 may be removably coupled to game console housing 301 via latches 307 and screen holder 314. Display device 316 may be coupled to screen holder 314. Latches 307 may include multiple latches that are elevated so a screen holder (e.g., screen holder 314) may be attached to any of the latches. An operator operating game console 300 may remove screen holder 314 from any of the latches and reattach screen holder 314 to a different latch to adjust a position of screen holder 314 and consequently a position of display device 316. In some embodiments, latches 307 and screen holder 314 may be configured so an operator may slide screen holder 314 between latches and lock screen holder 314 into place to set a position of screen holder 314. In some embodiments, screen holder 314 and/or display device 316 may be a part of game console housing 301.

Display device 316 may be coupled to screen holder 314. Display device 316 may be coupled to screen holder 314 with a fastener such as a snap fit, magnets, screws, nails, loop and hooks, etc. In some embodiments, display device 316 and screen holder 314 may be the same component. In these embodiments, display device 316 may be coupled to a latch of latches 307. In some embodiments, display device 316 may be rotatably coupled to screen holder 314 so display device 316 can be rotated about screen holder 314 to a position that an operator desires.

Display device 316 may be a displaying device that can communicate with the processing circuit of game console 300 to display a user interface of a game or application being processed by the processing circuit. In some embodiments, display device 316 may include an internal processing circuit including at least a processor and memory (not shown) that facilitates the transmission of data between display device 316 and the processing circuit of game console 300 and/or a processing circuit of an external device. Display device 316 is shown to include display 318. Display 318 may be similar to display 224, shown and described with reference to FIG. 2. Display device 316 may receive a data stream including a user interface from the processing circuit of game console 300 and display the user interface at display 318.

An operator may press command buttons 310 or 311 and/or power button 312 and/or pull trigger 304 to provide an input to the processing circuit of game console 300. By providing an input to the processing circuit, the operator may adjust the user interface that the processing circuit of game console 300 is providing via display device 316. For example, an operator may perform an action in a game by pressing one of command buttons 310 or 311. In another example, an operator may turn game console 300 on or off by pressing power button 312. Further, the operator may move (e.g., reorient) game console 300 to provide an input to the processing circuit and adjust the user interface of display device 316, as described above.

In some embodiments, game console 300 may include sensors (e.g., sensors) (as shown) that are internally coupled to game console housing 301. The sensors may be a part of an inertial measurement unit that includes sensors such as, but not limited to accelerometers, gyroscopes, magnetometers, etc. The sensors may provide position data identifying a position of game console housing 301 to the processing circuit of game console 300. The processing circuit may receive the position data and update a user interface of display 318 based on the position data.

To update the user interface, the processing circuit may receive current position data and compare the current position data to previous position data corresponding to a previous position of the game console housing. The processing circuit may identify a difference between the position data and update the user interface based on the difference. For example, the processing circuit may receive current position data of game console housing 301. Previous position data may indicate that game console housing 301 was pointing straight. The processing circuit may compare the current position data with the previous position data and determine that game console housing 301 is pointing left compared to the position of the previous position data. Consequently, the processing circuit may change a view of the user interface display 318 to move to the left of a virtual environment or move a cursor on the user interface to the left. In some embodiments, the previous position data may be a calibrated position of game console housing 301 set by an operator.

Characteristics of games or applications being processed by the processing circuit of game console 201 may be shown via light elements 313. Light elements 313 may include parallel slits (e.g., positioned in a row) in game console housing 301 with light bulbs that can provide different colors of light. Light elements 313 may be positioned in any manner. Further, light elements 313 may be positioned on either or both sides of elongated portion 306. The processing circuit of game console 300 may communicate with light elements 313 to provide light based on the game or application that the processing circuit is currently processing. Light elements 313 may provide light based on characteristics of the game or application that the processing circuit is processing. For example, light elements 313 may indicate an amount of health a character of a game has left based on the number of light elements 313 that are lit. In another example, light elements 313 may provide a number of lives that a character has left by lighting up a number of light elements 313 that corresponds to the number of lives the character has left. Light elements 313 may display any sort of characteristics of games or applications.

In an exemplary embodiment, an operator operating game console 300 may hold game console 300 with one or two hands. In some instances, an operator may hold game console 300 with one hand grabbing grip portion 302 and another hand holding onto a portion of game console housing 301 with a finger on trigger 304. In other instances, the operator may use one hand to pull trigger 304 while another hand grabs grip 308. Grip 308 may include a substance that an operator can grip without sliding a hand along elongated portion 306 (e.g., rubber). In some embodiments, portions of grip 308 may be elevated (ridges) from other portions of grip 308 to provide operators with further protections from sliding their hands. Grip 308 may be positioned on elongated portion 306 so hands that grab grip 308 can also push any of command buttons 310 and/or power button 312 without adjusting their position. While holding game console 300, the operator may view display device 316.

Figure 4:
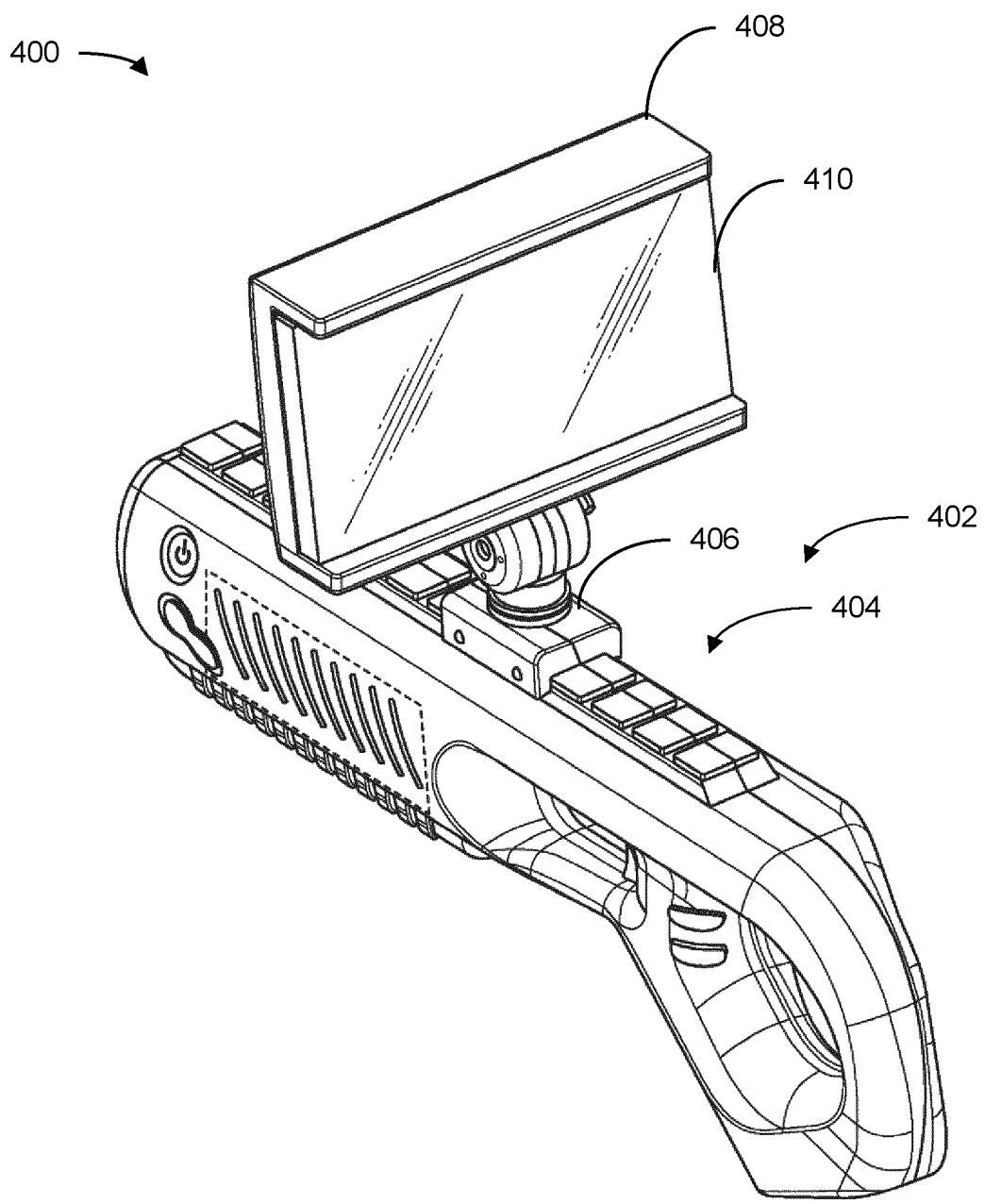
FIG. 4 is perspective view of another game console including a display device coupled to a game console housing of the game console, in accordance with some embodiments of the present disclosure.

Referring now to FIG. 4, a perspective view of a game console 400 including a display device 408 coupled to a game console housing 402 via a screen holder 406 is shown, in accordance with some embodiments of the present disclosure. Game console 400 may be similar to game console 300, shown and described with reference to FIG. 3. Game console 400 is shown to include a game console housing 402, latches 404, a screen holder 406, and a display device 408. Display device 408 is shown to include a display 410. Each of components 402-410 may be similar to corresponding components of game console 300. However, screen holder 406 of game console 400 may be coupled to a latch of latches 404 that is different from the latch that screen holder 314 of game console 300 is coupled to. Screen holder 406 may be coupled to a latch that is closer to an operator of game console 400 so the operator may more easily view display 410 when playing games or applications of game console 400. Screen holder 406 may be adjustable to be position at different locations on a barrel (e.g., on a latch of latches 404) of game console housing 402. Advantageously, screen holder 406 may be coupled to any latch of latches 404 so an operator may operate game console 400 with display 410 at any distance from the operator.

Figure 5:
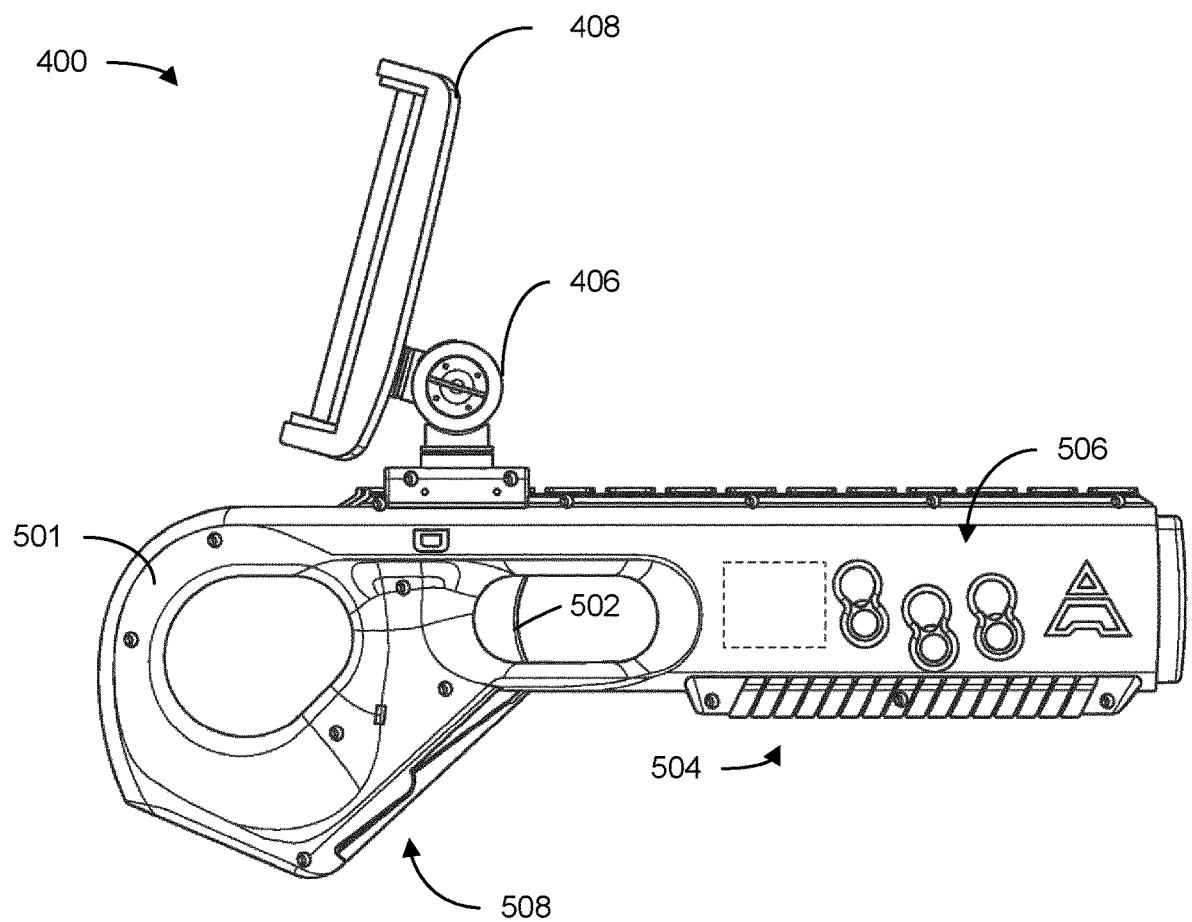
FIG. 5 is a side view of the game console of FIG. 4, in accordance with some embodiments of the present disclosure.

Referring now to FIG. 5, a side view of game console 400, shown and described with reference to FIG. 4, is shown, in accordance with some embodiments of the present disclosure. Game console 400 is shown to include a handle 501, a trigger 502, a grip 504, command buttons 506, a pedal 508, screen holder 406, and display device 408. An operator may interact with any of trigger 502, command buttons 506, and/or pedal 508 to provide inputs to a processing circuit of game console 400 as described above. Further, the operator may hold game console 400 by grabbing grip 504 and handle 501.

In some embodiments, display device 408 may be adjustably (e.g., rotatably) coupled to screen holder 406. Display device 408 may be coupled so an operator may reorient a position of display device 408 in relation to screen holder 406. For example, an operator may rotate display device 408 around screen holder 406 to face upwards or away from the operator. The operator may rotate display device 408 up to 180 degrees depending on how the operator desires display device 408 to be positioned.

Figure 6:
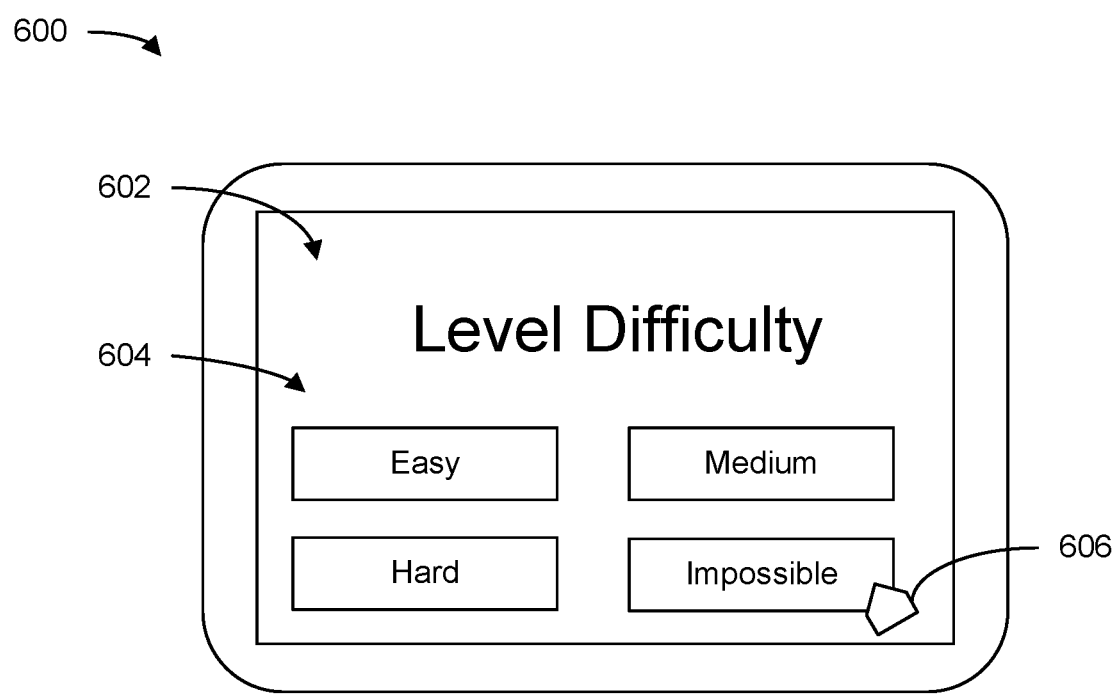
FIG. 6 is a screen display of a user interface displaying various levels of difficulty for an operator to select with the game console of FIG. 3, in accordance with some embodiments of the present disclosure.

Referring now to FIG. 6, a screen display 600 displaying various levels of difficulty for an operator to select with a game console (e.g., game console 201) is shown, in accordance with some embodiments of the present disclosure. Screen display 600 is shown to include a user interface 602. User interface 602 may be displayed by a display of the game console and be associated with a game or application that a processing circuit of the game console is processing. As shown, user interface 602 may include a selection list 604 and a cursor 606. Selection list 604 may include various options of levels of difficulty associated with a game that the game console is currently processing. For example, as shown, selection list 604 may include options such as an easy option, a medium option, a hard option, and an impossible option. An operator may view selection list 604 and select one of the options to begin playing the game with a difficulty associated with the selected option.

In some embodiments, to select an option from selection list 604, an operator may change an orientation of game console 201 to move cursor 606 towards a desired option. The change in orientation may be represented by a change in a position of an end of a barrel of the game console. For example, if cursor 606 is at a top left corner of user interface 602 and an operator wishes to select a medium option of selection list 604, the operator may direct the position of the end of the barrel downwards. The processing circuit of the gaming device may receive signals from sensors of the gaming device indicating that the end of the barrel is moving or has moved downwards and move cursor 606 corresponding to the detected movement. Once cursor 606 is over the desired option (e.g., medium), the operator may select the option by pressing an input button or pulling a trigger of the game console. The operator may move cursor 606 in any direction on user interface 602 based on the movement of the game console.

Figure 7:
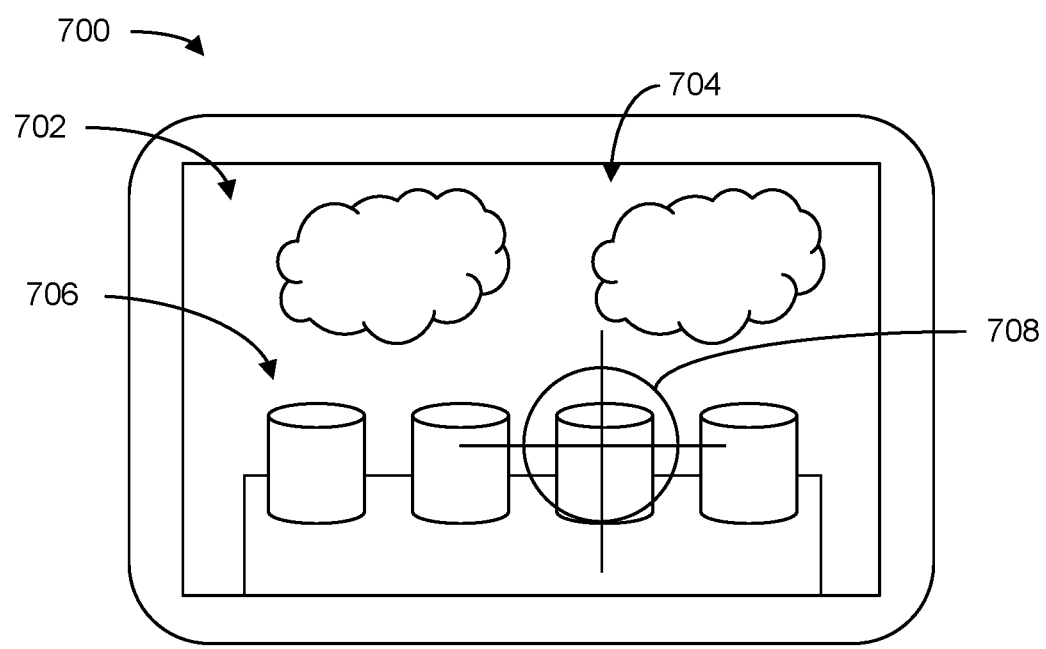
FIG. 7 is a screen display of a user interface of a game being played on the game console of FIG. 3, in accordance with some embodiments of the present disclosure.

Referring now to FIG. 7, a screen display 700 including a user interface 702 of a game being played via a game console (e.g., game console 201) is shown, in accordance with some embodiments of the present disclosure. User interface 702 may be generated and updated by a processing circuit of the game console. User interface 702 may be associated with a game being processed by the processing circuit. The processing circuit may update user interface 702 in response to receiving an input associated with an operator pressing on input buttons on an exterior surface of the game console, pulling a trigger of the game console, or moving or reorienting the game console. User interface 702 is shown to include an environment 704 represented by clouds, a line of cans on a table 706, and crosshairs 708. An operator operating the game console may interact with user interface 702 by moving and pressing push buttons on the game console.

For example, an operator may control a position of crosshairs 708 by moving the game console in a similar manner to how the operator controlled the position of cursor 606, shown and described above with reference to FIG. 6. The operator may position crosshairs 708 over one of the cans and shoot at the cans by pulling on the trigger of the game console. The processing circuit of the game console may receive an indication that the operator pulled the trigger and update user interface 702 to play a sequence of a gun firing at a position represented by a middle of crosshairs 708. If the operator was successful at firing at a can, the processing circuit may update user interface 702 to play a sequence of the can falling off of the table.

Figure 8:
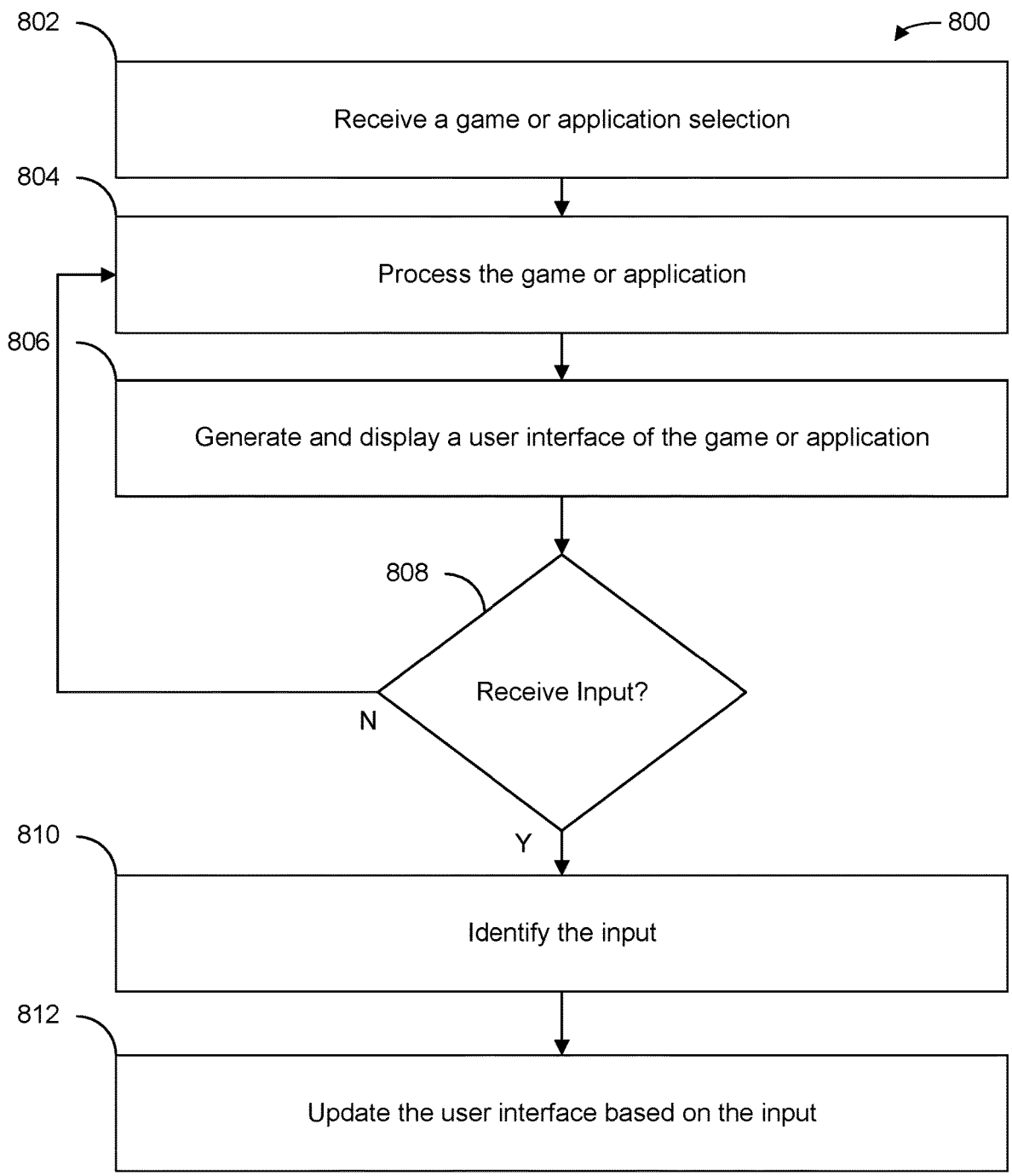
FIG. 8 is an example flowchart outlining operation of the game console of FIG. 3, in accordance with some embodiments of the present disclosure.

Referring now to FIG. 8, an example flowchart outlining operation of a game console as described with reference to FIG. 2 is shown, in accordance with some embodiments of the present disclosure. Additional, fewer, or different operations may be performed in the method depending on the implementation and arrangement. A method 800 conducted by a data processing system (e.g., game console 201, shown and described with reference to FIG. 2) includes receive a game or application selection (802), process the game or application (804), generate and display a user interface of the game or application (806), "receive input?" (808), identify the input (810), and update the user interface based on the input (812).

At operation 802, the data processing system may receive a game or application selection 802. The data processing system may display a list of games retrieved over a network via an online exchange. The data processing system may display the list of games on a screen of a display device that coupled to a housing of the data processing system. The list of games may be displayed on a user interface that the data processing generates. An operator accessing the data processing system may select one of the games by rotating the housing and pressing a push button or pulling on a trigger of the housing. The data processing system may receive a signal indicating the change in position (e.g., the movement) of the housing and move a cursor being displayed on the user interface. The data processing system may move the cursor in the same direction on the user interface as the operator moves the housing.

Once the operator selects the game or application, at operation 804, the data processing system may process the game or application. The data processing system may process the game or application by downloading files associated with the selected game or application from an external server or processor that stores the selected game or application. The data processing system may download the game or application over a network. Once the data processing system downloads the game or application, at operation 806, the data processing system may generate a user interface associated with the game or application and display the user interface on the screen. In some instances, the game or application may already be downloaded onto the data processing system. In these instances, the data processing system may process the selected game or application to generate the user interface on the screen without downloading the selected game or application from the external server or processor.

Once the data processing system displays the user interface, at operation 808, the data processing system can determine if it has received an input. The data processing system may receive an input when the operator that is operating the data processing system presses on a push button of the housing of the data processing system or changes a position of the housing. If the data processing system does not receive an input, method 800 may return to operation 804 to continue processing the game or application and display the user interface at operation 806 until the data processing system receives an input.

If the data processing system receives the input, at operation 810, the data processing system may identify the input. The data processing system may determine an action associated with the game or application that the data processing system is processing based on the input. For example, the data processing system may receive an input based on the operator pressing a push button. The data processing system may match the push button to a jump action in a look-up table stored by the data processing system. Consequently, the data processing system may determine jumping to be the action.

Once the data processing system determines the action, at operation 812, the data processing system may update the user interface based on the input. The data processing system may display an action sequence at the user interface on the screen based on the determined action. Continuing with the example above associated with the input associated with the jump action, upon determining the jumping action, the data processing system may update the user interface to show a jumping sequence.

In another instance, at operation 810, the data processing system may display a cursor at the user interface. The input may be a detected movement of the housing of the data processing system that sensors coupled to the housing provide to the data processing system. The data processing system may identify the detected movement as movement of the housing. At operation 812, the data processing system may move the cursor on the user interface corresponding to the detected movement of the housing. To move the cursor, the data processing system may detect a current position of the cursor and move the cursor in the same direction as the detected movement of the housing.

Figure 9:
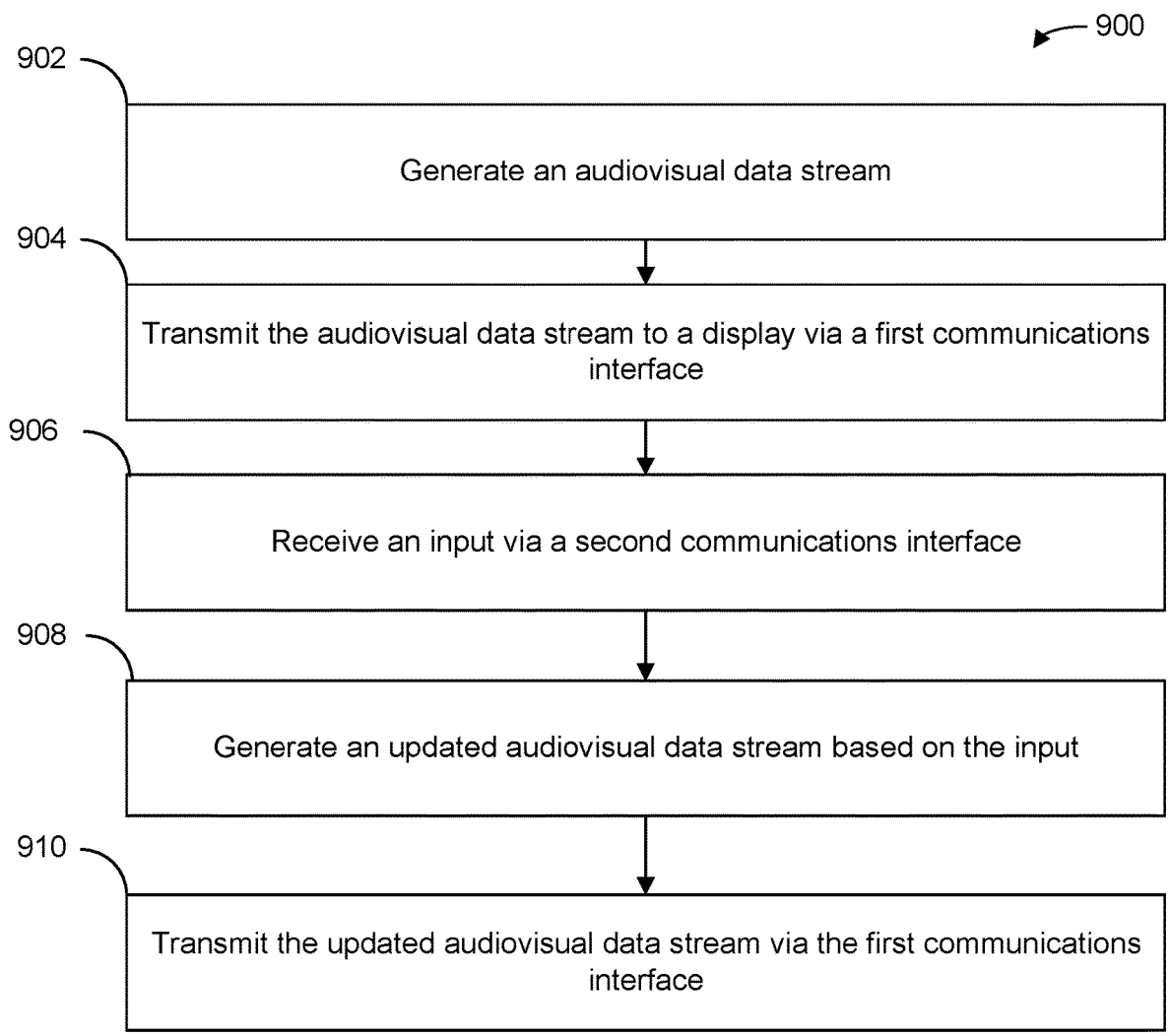
FIG. 9 is an example flowchart outlining a gaming device streaming audiovisual data to the display device of the game console of FIG. 3 while the game console provides inputs to the gaming device, in accordance with some embodiments of the present disclosure.

Referring now to FIG. 9, an example flowchart outlining operation of a game console in communication with a remote gaming device as described with reference to FIG. 2 is shown, in accordance with some embodiments of the present disclosure. Additional, fewer, or different operations may be performed in the method depending on the implementation and arrangement. A method 900 conducted by a first data processing system (e.g., a processing circuit of remote device 228, shown and described with reference to FIG. 2) in communication with a second data processing system (e.g., a processing circuit of game console 201) and a display device coupled to housing of the second data processing system (e.g., display device 222). Method 900 includes generate an audiovisual data stream (902), transmit the audiovisual data stream to the game console (904), receive an input from the game console (906), generate an updated audiovisual data stream (908), and transmit the updated audiovisual data stream (910).

At operation 902, the first data processing system may generate an audiovisual data stream. The first data processing system may generate the audiovisual data stream while processing a game or application associated with the first data processing system. The audiovisual data stream may include visual data associated with a user interface associated with the game or application. The audiovisual data stream may also include audio data that corresponds to the user interface. The user interface may be an interface of a game or application including graphics, menus, or any other component that an operator may view while playing the game or application.

At operation 904, the first data processing system may transmit the audiovisual data stream to the display device of the housing of the second data processing system via a first communication interface and a first communication protocol. The display device may display the user interface of the audiovisual data stream at a screen of the display device. The first communication interface may utilize a lossy transport layer communication protocol. The lossy transport layer communication protocol may enable the display device to quickly handle and display image data and handle quick changes in the user interface (e.g., when a user quickly moves a heads up display while playing a first-person shooting game). While the lossy transport layer communication protocol may cause for the image data to be missing a few data packets (and cause for the picture to be less detailed), the advantages of such a protocol may greatly improve the playing experience of a user that wishes to quickly scan a three-dimensional virtual environment. In some embodiments, the first communication interface may utilize HDbitT® or WiFi to transmit image and/or other data. In some embodiments, an external device may plug in to the first data processing system to provide a wireless HDMI connection from the first data processing system to the display device.

At operation 906, the first data processing system may receive an input from the second data processing system via a second communication interface. The second communication interface may utilize a lossless transport layer communication protocol to transmit data. For example the second communication interface utilize the lossless transport layer communication protocol to transmit control signals such as signals from one or more of position sensors, joystick data, or button data to the first data processing system. In some embodiments, the second communication interface may utilize Bluetooth or other forms of communication to do so. The input may correspond to a signal generated by the second data processing system responsive to an operator pressing a push button on the housing of the second data processing system, joystick data, or data generated by sensors coupled to the housing detecting that the housing moved. The second data processing system may process the signals generated from the sensors based on detected movement, joystick data, or push buttons based on the push buttons being pressed and send the signals to the first data processing system to be processed. Advantageously, by using a lossless transport layer communication protocol to transmit such signals to the first data processing system, the second communication interface may ensure that signals are sent and processed accurately.

At operation 908, the first data processing system may receive the signals from the second data processing system and generate an updated audiovisual data stream based on the signals. The first data processing system may receive the inputs and determine actions that are associated with the inputs. The first data processing system may determine the actions by comparing the inputs to an internal look-up table that is specific to the game or application that the first data processing system is currently processing. The first data processing system may identify a match and generate an updated audiovisual data stream based on the match in the look-up table. At operation 910, the second data processing system may transmit the updated audiovisual data stream to the display device to update the user interface being shown on the display via the first communication interface and the first communication protocol.

In some embodiments, the first data processing system may receive a signal from a joystick and a signal from a position sensor of the second data processing system. The first data processing system may combine the signals and generate the updated audiovisual data stream based on the updated signal. In some embodiments, the second data processing system may combine the signals to generate a third signal and transmit the third signal to the first data processing system. The first data processing system may update the audiovisual data stream based on the third signal in such embodiments. The first data processing system or the second data processing system may combine the signals in the manner described below with reference to FIGS. 10A-C.

Advantageously, by using different communication protocols to transmit data between a data processing system and a remote data processing system depending on the type of data being transmitted, the data processing system may operate to provide a more low-latency experience to a user playing a video game. Using a lossless communication layer protocol to transmit control signals to the remote data processing is useful for control signals that are smaller and that are more important to be accurate. The communication may still be fast while ensuring higher accuracy of the signal. On the other hand, because the remote data processing system responds with audiovisual data and especially in an application context where the interface change rapidly, it may be important for the remote data processing system to send large data files such as audiovisual data back to data processing system to ensure that the user interface can keep up with any inputs the user provides to the remote data processing system.

Figure 10A:
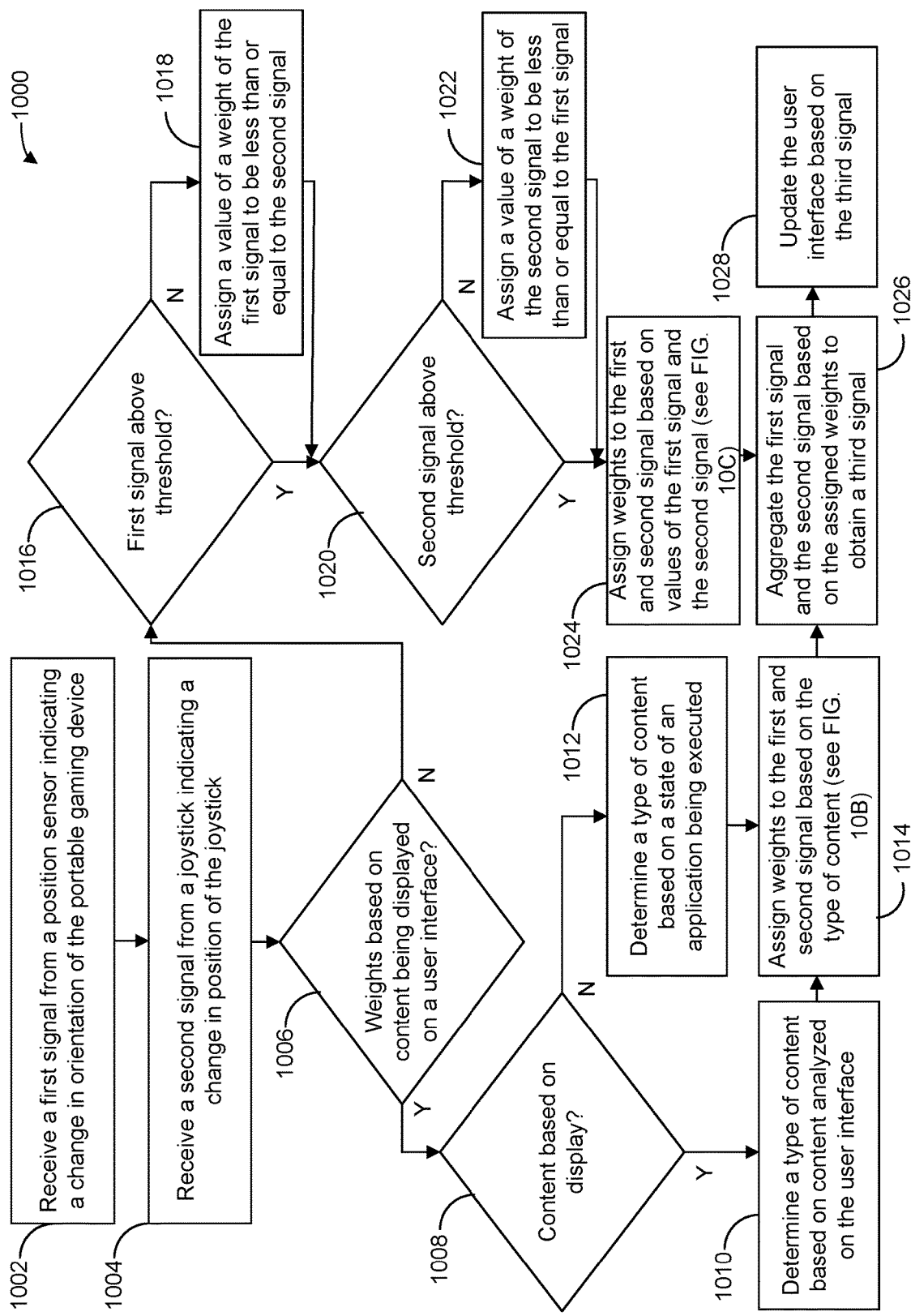
FIG. 10A is an example flowchart outlining aggregating signals from a joystick and a position sensor to update a user interface, in accordance with some embodiments of the present disclosure.

Referring now to FIG. 10A, an example flowchart outlining updating a user interface based on a combination of signals from a joystick and a position sensor is shown, in accordance with some embodiments of the present disclosure. Additional, fewer, or different operations may be performed in the method depending on the implementation and arrangement. A method 1000 conducted by a data processing system (e.g., processing circuit 202 or processing circuit 230, shown and described with reference to FIG. 2). Method 1000 may enable the data processing system to dynamically process and combine inputs from a joystick and position sensors to update a user interface. Method 1000 may enable the data processing system to do so by assigning and updating weights for signals from the joystick and the position sensors as a user accesses different applications and/or states of an application.

At operation 1002, the data processing system may receive a first signal from a position sensor indicating a change in orientation of a portable gaming device. The position sensor may be a gyroscope, an accelerometer, an inertial measurement unit, or some other position sensing device. In some embodiments, the first signal includes a magnitude or value indicating an amount of change in the orientation of the portable gaming device. For example, a user holding the portable gaming device may point the portable gaming device from a straight position to a position looking up. A position sensor may detect the change in position of the portable gaming device and generate and transmit a signal with a value or magnitude that is proportional to the change in position of the portable gaming device to the data processing system. In some embodiments, the signal also includes a direction. Continuing with the example above, the signal may include a direction indicator indicating that the user holding the portable gaming device pointed the device upwards in the signal.

At operation 1004, the data processing system may receive a second signal from a joystick indicating a change in position of the joystick. The joystick may be a 3-axis or a 2-axis joystick, a directional pad, a square or rectangular touchpad, or similar interface. Further, the joystick may be a digital joystick, a paddle joystick, an analog joystick, a PC analog joystick, a joypad, or any other type of joystick. In some embodiments, the second signal may include a magnitude or value indicating an amount of change in position of the joystick from a resting position. For example, the second signal may be an analog voltage representing a distance on an axis (e.g. x or y axis) that the joystick has been moved, or the second signal may be a digital signal representing a quantized position along the axis determined via an analog to digital converter. In some embodiments, the magnitude of the second signal corresponds to an angle at which the joystick pivots from its contact point with the portable gaming device. In some embodiments, the larger the angle, the larger the magnitude. For example, a user holding the portable gaming device may maneuver the joystick with his or her thumb. The user may push the joystick sideways. Accordingly, the joystick may generate a signal indicating that the user pushed the joystick sideways and a magnitude of the distance that the user pushed the joystick sideways. The joystick may send such a signal to the data processing system for processing in addition to or instead of the signal that the position sensor sends.

At operation 1006, the data processing system may determine whether to assign weights to the first signal and the second signal based on content currently being displayed on a user interface of the portable gaming device or based on the first signal and/or the second signal. The data processing system may determine to assign the weights based on the content being displayed on the user interface if there is a change in what is being shown on the user interface or if there is a change in a state of an application being executed by the data processing system. For example, the data processing system may determine to assign weights based on the content being shown on the user interface if the data processing system detects that a user just entered a zoomed-in view of the user interface. In another example, the data processing system may determine to assign weights based on the content being shown on the user interface if the data processing system determines that the application being executed by the data processing system entered a state with a menu. In some embodiments, the data processing system may determine to assign the weights based on a type of application that the processor just began executing. For example, if the data processing system begins executing an application, the data processing system may identify a type of the application (e.g., first-person shooter, adventure game, menu game, joystick focused game, etc.) and assign weights to the signals based on the determined type of the application.

The data processing system may determine to assign weights based on the first signal and/or the second signal if the data processing system detects a sudden change in the value of the first signal and/or the second signal. For example, if a user suddenly pushes a joystick forward, the data processing system may detect the change and assign or adjust weights to the signals accordingly. In another example, if a user suddenly jerks the portable game console upwards, the data processing system may receive a signal from the position sensor indicating the sudden change in orientation of the portable gaming device and adjust the weights of the signals accordingly. Accordingly, in some implementations, weights may be assigned or adjusted responsive to a derivative or rate of change of either or both signals.

If the data processing system determines to assign weights to the application based on the content being displayed on the user interface, at operation 1008, the data processing system may determine whether to determine a type of the content by analyzing the contents of the user interface or whether to analyze the state of the application being executed by the data processing system. The data processing system may utilize the type of content to determine weights for the signals from the joystick and/or the position sensors. The data processing system may make such a determination based on how it is configured (e.g., based on settings established by an administrator). For example, an administrator may configure the data processing system to determine the type of content based on the objects or structures that are displayed via the user interface or based on a state of the application that the data processing system is executing.

If the data processing system is configured to determine the type of content based on the display, at operation 1010, the data processing system may analyze the current user interface to determine the type of content the user interface is currently displaying. For instance, the data processing system may use screen scraping or optical character recognition to identify objects and/or characteristics of the user interface to determine a type of content currently being shown on the user interface. For example, the data processing system may identify portions of the interface and determine that cross hairs of a heads up display (HUD) are larger than normal and consequently determine that the display is displaying a zoomed-in first-person shooter type content based on the large cross hairs. In another example, the data processing system may identify outlines of a menu system and determine that the type of content currently being displayed on the user interface is a menu. The data processing system may use any objects or indicators on the display to determine type of content currently being displayed. Examples of types of content include, but are not limited to, zoomed-in first-person shooter, text, HUD, menu, browser, etc.

The data processing system may also analyze the content being displayed on the user interface by sending an application programming interface (API) request to the user interface. The user interface may respond with a list of objects currently being displayed. The user interface may also include other metadata about the user interface such as layout metadata and record metadata. Accordingly, the data processing system may compare the response from the user interface to a database to match the objects to a type of content currently being displayed on the user interface. If the data processing system finds a type of content with matching characteristics of the response to the database, the data processing system may determine the type of content with the matching characteristics is the type of content currently being displayed on the user interface. For example, the data processing system may send an API request to the user interface. The user interface (through an API) may respond with a list of objects that are normally found in an HUD. The data processing system may compare the list of objects to a database within the data processing system and determine that the type of content currently being shown is an HUD.

If, at operation 1008, the data processing system is configured not to determine the content on the display based on the display of the user interface itself, at operation 1012, the data processing system may determine the type of content based on a state of an application being executed. The data processing system may determine the state of the application by analyzing the application by identifying the part of the application that is currently executing and determining a state based on the identified part. The data processing system may identify the part of the application by keyword parsing through the code of the application being executed to identify the state of the application. For example, the data processing system may analyze the code of the application that is currently being executed to identify any words that are associated with a state. The data processing system may compare the code to a database to identify any matching states. In some embodiments, the application may be configured to have indications indicating a current state of the application. For example, whenever a user enters into a zoomed-in view of an environment of a first-person shooter, the corresponding application may specify a tag that the data processing system may read indicating that the user interface is currently showing the zoomed-in view. The data processing system may use any method to identify the current state of an application being executed.

At operation 10124, the data processing system may assign weights to the first and second signal based on the type of content that was determined in operations 1010 and 1012. The data processing system may assign the weights by identifying the type of content currently being shown and assigning weights to each signal based on a type of content in a database of the data processing system. An example process for determining the types of weights for the signals based on the type of content currently being shown on the user interface is shown and described below with reference to FIG. 10B. Each signal may be assigned any weight. In some embodiments, the weights may be assigned and updated as the application is being executed so the weights may correspond to the types of content on display on the user interface in real-time.

If, at operation 1006, the data processing system determines that weights for signals for the joystick and the position are based on sudden changes in orientation of the portable gaming device, at operation 1016, the data processing system may determine if the first signal from the position sensor has a value that exceeds a threshold. As described above, the first signal may be associated with a value or weight indicating a degree to which the user reoriented the portable gaming device. The data processing system may compare the value to a threshold that is predetermined by an administrator. The data processing system may do so to stop slight movements from greatly impacting a change in the user interface. For example, if a user is playing a first-person shooter and attempting to shoot at a small object, the data processing system may adjust the weights of the signals to avoid changing the user interface based not twitches or slight variations in the position of the portable gaming device when a user is attempting to keep the portable gaming device in one position. Accordingly, the data processing system may determine whether the user is reorienting the portable gaming device to a threshold to avoid slight movements from having a great impact on the user interface.

If, at operation 1016, the data processing system determines that the signal from the position sensor is below the threshold, at operation 1018, the data processing system may assign a value of a weight of the first signal to be less than or equal to a weight of the second signal from the joystick. The data processing system may be configured to assign the weight to be zero, in some instances. For example, if a user is attempting to target a small object and only slightly moving the portable gaming device, the data processing system may adjust the weight of the signal from the position sensor to be zero. Consequently, the user may aim at the small object using only the joystick, improving the accuracy of the user.

If, at operation 1016, the data processing system determines that the first signal from the position sensor is above the threshold, at operation 1020, the data processing system may determine whether the second signal from the joystick is above the threshold. Similar to the position sensor signal, the data processing system may determine if the second signal is above the threshold to avoid any drift in the user interface that may occur if the joystick is not repositioned perfectly after being moved or when the joystick moves back to its home position (e.g., about 90 degrees to the portable gaming device). For example, if a user uses the joystick to control a view on the user interface, the joystick may not perfectly go back to home position. By establishing a threshold change in position that the joystick must exceed to be used, any danger of the user interface drifting may be minimized. The threshold may be set by an administrator.

If, at operation 1020, the data processing system determines that the signal from the position sensor is below the threshold, at operation 1022, the data processing system may assign a value of a weight of the second signal from the joystick to be less than or equal to a value of a weight of the first signal from the position sensor. The data processing system may be configured to assign the weight to be zero, in some instances. For example, as described above, the data processing system may assign the joystick with a weight of zero to avoid any drift in the user interface.

If, at operation 1020, the data processing system determines that the signal from the joystick is below the threshold, at operation 1024, the data processing system may otherwise assign weights to the first and second signals based on the values of the first and second signals. For example, the data processing system may compare the values of the first and second signals to each other and, if one value is significantly higher than the other, the data processing system may determine that the signal with the significantly higher value is more important and worth more weight. If the weights are similar, the data processing system may not adjust or update the weights. Accordingly, the data processing system may adjust or update the weights according to how the user is manipulating the portable gaming device and/or moving the joystick. The data processing system may assign any weights to the signals based on the joystick and/or position sensor signals. An example process for determining the types of weights for the signals based on the signals themselves is shown and described below with reference to FIG. 10C. Each signal may be assigned any weight. In some embodiments, the weights may be assigned and updated as the application is being executed so the weights may correspond to how users operate the portable gaming device in real-time.

At operation 1026, the data processing system may aggregate the weighted first signal and the weighted second signal to obtain a third signal. The data processing system may perform any operation (e.g., aggregation, multiplication, averaging, subtraction, etc.) on the weighted signals to obtain the third signal. For example, the data processing system may multiply the weights by their corresponding values and aggregate or add the resulting values to obtain the third signal. In another example, the data processing system may multiply the weights by their corresponding values and multiply the resulting signals to obtain the third signal. The data processing system may perform any operations on the weights and the weighted signals to obtain the third signal.

At operation 1028, the data processing system may update the user interface based on the third signal. The data processing system may update the user interface based on the application that the data processing system is executing. For example, if the data processing system is executing an application with a cursor, the data processing system may update the user interface by moving the cursor proportional to and in a direction specified by the third signal. In another example, the data processing system may update the user interface by changing the view of the HUD in a three-dimensional environment. In yet another example, the data processing system may perform a predetermined action that is associated with any of the first, second, or third signals (e.g., a sudden jerk movement up in the portable gaming device may cause a reloading action to occur on the user interface). The data processing system may update the user interface in any manner based on these signals.

Figure 10B:
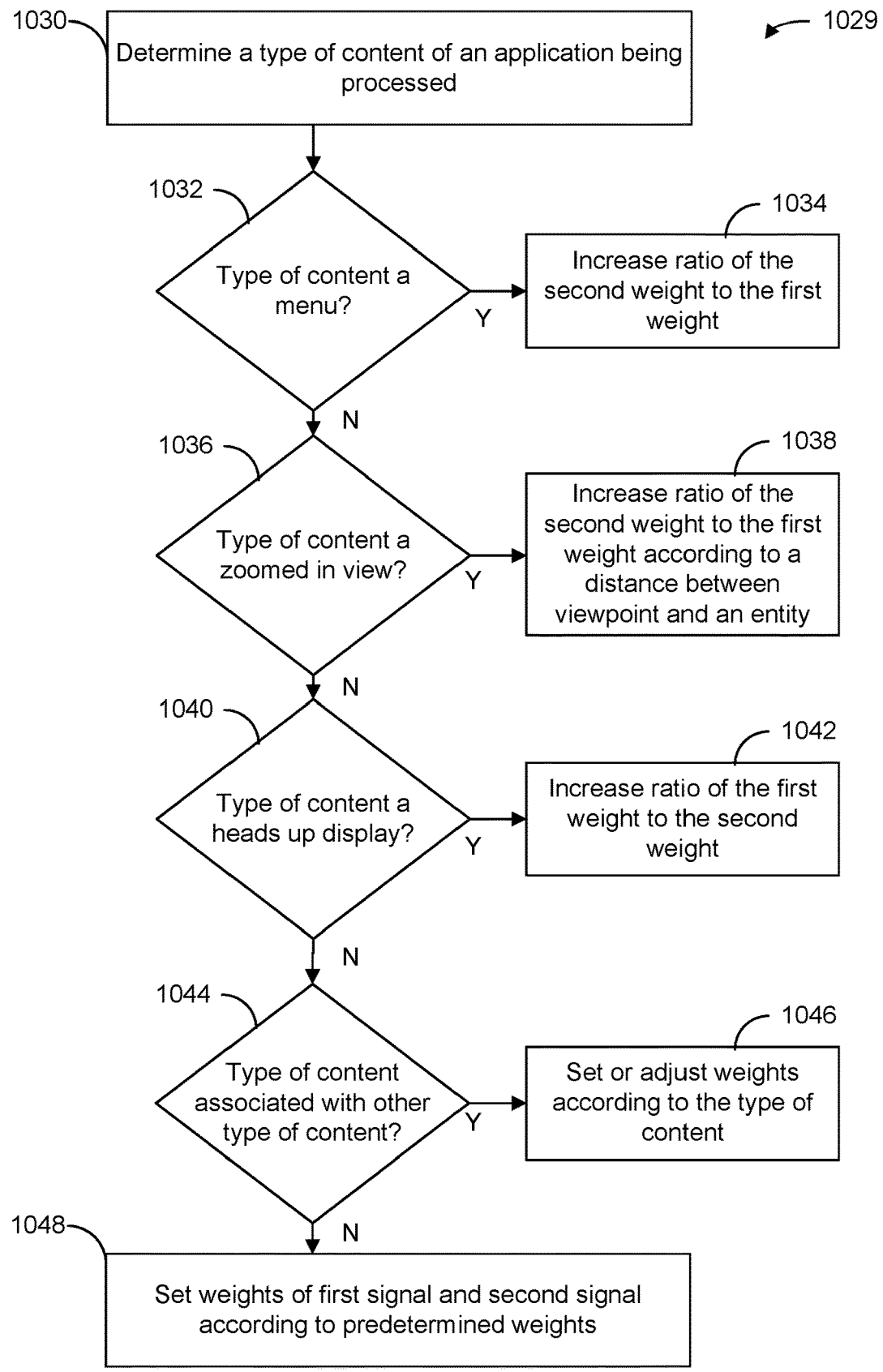
FIG. 10B is an example flowchart outlining assigning weights to a joystick signal and/or a position sensor signal based on a type of content being displayed on a display, in accordance with some embodiments of the present disclosure.

Referring now to FIG. 10B, an example flowchart outlining assigning weights to a joystick signal and/or a position sensor signal based on a type of content being displayed on a display is shown, in accordance with some embodiments of the present disclosure. Additional, fewer, or different operations may be performed in the method depending on the implementation and arrangement. A method 1029 conducted by a data processing system (e.g., processing circuit 202 or processing circuit 230, both shown and described with reference to FIG. 2). Method 1029 may enable the data processing system to dynamically assign weights to joystick signals and position sensor signals based on a type of content currently being displayed on a user interface.

At an operation 1030, the data processing system may determine a current type of content of an application currently being executed. As described above with reference to operations 1008-1012, shown and described with reference to FIG. 10, the data processing system may determine the current type of content based on what is being displayed on the screen or based on the current state of the application being executed. For example, the data processing system may determine the current type of content using API requests, screen scraping, or by otherwise analyzing the application to determine its state in real-time. The data processing system may determine the current type of content in any manner.

At an operation 1032, the data processing system may determine if the type of content is a menu. The data processing system may make such a determination by analyzing the user interface looking for keywords or otherwise outlines of menus. In some embodiments, the data processing system may determine the type of content by analyzing the application being executed and determining a current state of the application. If the data processing system determines that the current type of content being displayed on the user interface is a menu, at an operation 1034, the data processing system may increase the ratio of the second weight (e.g., the weight of the joystick signal) to the first weight (e.g., the weight of the position sensor signal). The data processing system may solely increase the weight of the second signal, solely decrease the weight of the first signal, or do both to increase the ratio. Advantageously, by making the joystick have a larger impact when the user interface is a menu, a user may more accurately select a menu item without having to move the portable gaming device and instead just use the joystick.

At an operation 1036, the data processing system may determine if the type of content is a zoomed-in type of content. For example, a zoomed-in type of content may be a close-up view of an area within a three-dimensional environment compared to a standard view. For instance, if a person playing a first-person shooter scopes in to get a closer view of an area, that is a zoomed-in type of content. The data processing system may make such a determination by analyzing the user interface looking for thick outlines of crosshairs or some other indicator on the user interface or performing any method of determining the type of content as described herein. If the data processing system determines that the current type of content being displayed on the user interface is a zoomed-in type of content, at an operation 1038, the data processing system may increase the ratio of the second weight to the first weight. For example, the data processing system may solely increase the weight of the second signal, solely decrease the weight of the first signal, or do both.

In some embodiments, the data processing system may increase the ratio according to a distance an entity within the three-dimensional environment is from a viewpoint of the user interface (e.g. a distance between an entity and a virtual camera within a three-dimensional virtual environment). For example, if the entity is a large distance away, the data processing system may cause the ratio of the second signal to the first signal to be higher than if the entity is a close distance away. In some embodiments, the data processing system may otherwise adjust the weights according to the position of the entity by keeping the ratio the same while increasing or decreasing both the weights of the second signal and the first signal. Advantageously, by making the joystick have a larger weight when the user interface is in a zoomed-in view, a user may more accurately shoot at an object that may be smaller on the user interface. Further, by dynamically adjusting the weights based on a target entity, a user may more accurately aim at the target entity.

At an operation 1040, the data processing system may determine if the type of content is an HUD. The data processing system may make such a determination by analyzing the user interface looking for indicators of a HUD on the user interface or by using any other method as described herein. If the data processing system determines that the current type of content being displayed on the user interface is an HUD, at an operation 1042, the data processing system may increase the ratio of the first weight to the second weight. For example, the data processing system may solely increase the weight of the first signal, solely decrease the weight of the second signal, or do both. Advantageously, by making the position sensor signal have a larger weight when the user interface is an HUD, a user may more quickly scan a three-dimensional environment by reorienting the portable gaming device while being able to use the joystick to hone in on targets within the environment.

At an operation 1044, the data processing system may determine if the type of content is any other type of content with an identification in a database of the data processing system. The data processing system may make such a determination by analyzing the user interface and/or the application being executed by the data processing system using any of the methods described herein and comparing characteristics of the user interface or a current state of the application to a database. If the data processing identifies any matching types of content, the data processing system may identify a corresponding set of weights and, at an operation 1046, the data processing system may set or adjust the weights of the first and/or the second signal according to the corresponding set of weights. An administrator may set or adjust the weights for each type of content and store the set or adjusted weights in the database. An administrator may set or adjust the weights to any values.

If the data processing system does not identify any types of content from the state of the application or the user interface, at an operation 1048, the data processing system may set the weights of the first signal and second signal to predetermined weights. The predetermined weights may be any set of weights as determined by an administrator. For example, the predetermined set of weights may have the weight associated with the second signal from the joystick to be lower than the weight associated with the first signal from the position sensor. Accordingly, a user may use the joystick for fine control of the user interface and the position sensor signal to make larger changes while controlling the user interface. For example, a user may quickly scan a three-dimensional environment by reorienting the portable gaming device while using the joystick to hone in on a target. An administrator may set the preset weights as they desire. Advantageously, by using the preset weights, an administrator may control the user interface of the portable gaming console as he or she intends.

Figure 10C:
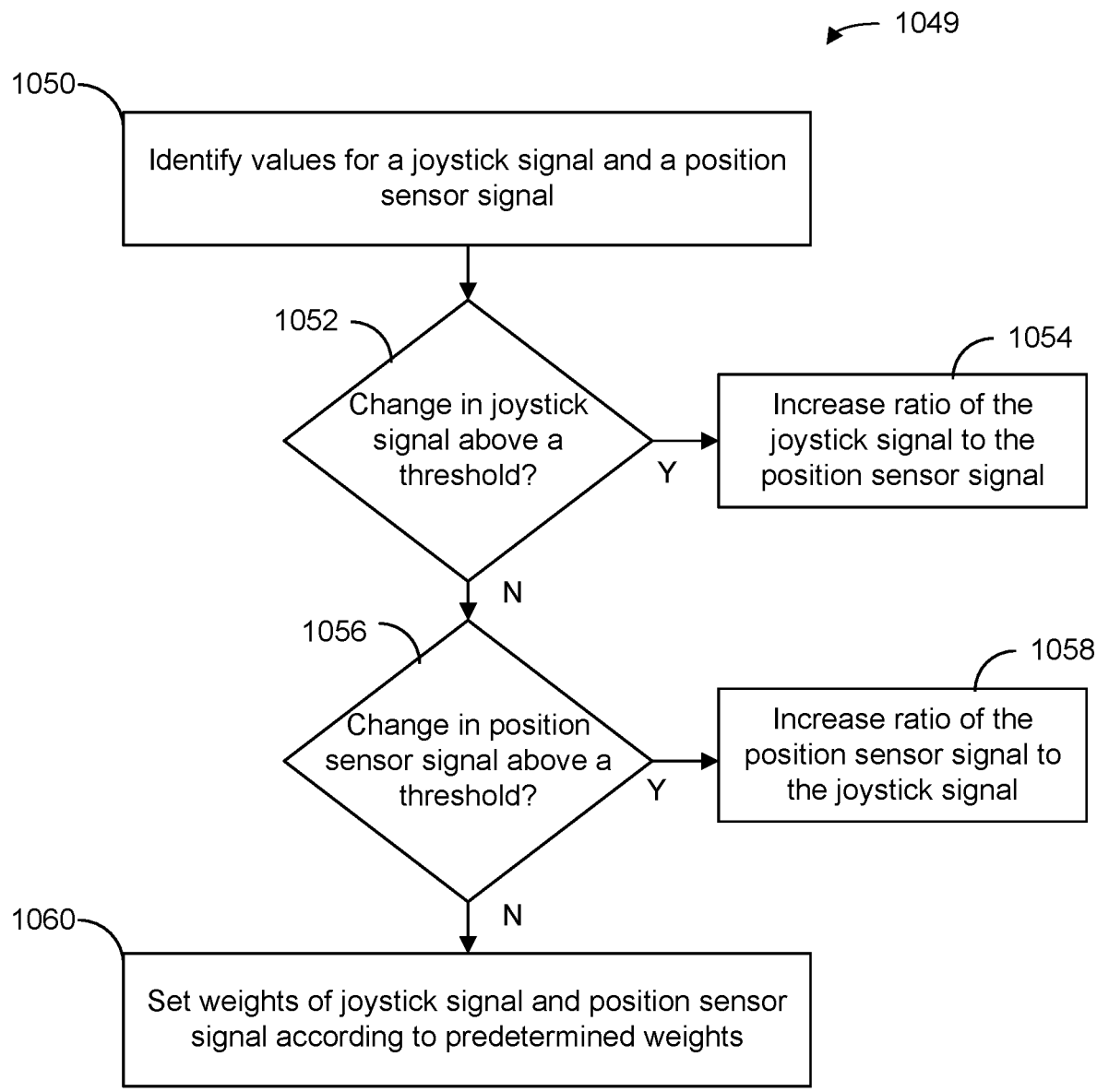
FIG. 10C is an example flowchart outlining assigning weights to a joystick signal and/or a position sensor signal based on a change in position of a joystick or a game console, in accordance with some embodiments of the present disclosure.

Referring now to FIG. 10C, an example flowchart outlining assigning weights to a joystick signal and/or a position sensor signal based on a change in position of a joystick or a game console is shown, in accordance with some embodiments of the present disclosure. Additional, fewer, or different operations may be performed in the method depending on the implementation and arrangement. A method 1049 conducted by a data processing system (e.g., processing circuit 202 or processing circuit 230, both shown and described with reference to FIG. 2). Method 1049 may enable the data processing system to dynamically assign weights to joystick signals and position sensor signals based on values of the signals themselves.

At an operation 1050, the data processing system may identify values for a joystick signal and a position sensor signal. The values may be a magnitude of a change in position of the position sensors and/or the joystick with respect to its previous position or resting position. The data processing system may identify the values based on the signals that the data processing system receives. For example, if a user moves a joystick far forward, the data processing system may identify a high value associated with forward movement of the joystick. In another example, if a user suddenly points the portable gaming device downward, the data processing system may identify a value of the signal from the position sensor as a large value associated with a downward movement. The data processing system may identify values in any manner.

At an operation 1052, the data processing system may determine if the change in the joystick signal is above a threshold. For instance, the data processing system may compare the value of the signal that it receives from the joystick to a threshold and determine if the value is above the threshold. If the data processing system determines the value to be above the threshold, at operation 1054, the data processing system may increase the ratio of the joystick signal to the position sensor signal. The data processing system may do so in cases where a user is only using or mostly using the joystick to update the user interface, such as when the user is controlling a cursor on a menu interface or a zoomed-in view of an application. By increasing the weight of the joystick, the data processing system may allow for users to more easily control the user interface.

At an operation 1056, the data processing system may determine if the change in the position sensor signal is above a threshold. For instance, the data processing system may compare the value of the signal that it receives from the position sensor to a threshold and determine if the value is above the threshold. If the data processing system determines the value to be above the threshold, at operation 1058, the data processing system may increase the ratio of the position sensor to the joystick signal. The data processing system may do so in cases where a user is only using or mostly using control of the portable gaming device to update the user interface, such as when the user is controlling an HUD. By increasing the weight of the position sensor signal, the data processing system may allow for users to more easily control the user interface. If the data processing system determines that neither the weight of a change in the joystick signal or a change in the position sensor signal exceeds a threshold, at operation 1060, the data processing system may set weights of the joystick signal and the position sensor signal according to predetermined weights.

The data processing system may set the weights similar to how the data processing system set the weights in operation 1048, shown and described with reference to FIG. 10B.

Referring now to FIG. 11, a perspective view of a game console 1100 including a screen holder 1106 coupled to a game console housing 1108 of game console 1100 and a joystick 1102, in accordance with some embodiments of the present disclosure. Screen holder 1106 may be configured to hold a mobile device (e.g., a smartphone) (not shown) to execute applications on the mobile device. The mobile device may communicate with a processor internally coupled to game console housing 1108 to operate as game console 1100. The processors may operate and communicate together to process games or applications while using various inputs to update the user interface on the mobile device. In some embodiments, instead of a mobile device, a different display device may be coupled to game console housing 1108 and any processing that is performed is performed on the processor that is internally coupled to the game console housing 1108 or on a remote device (not shown).

A user may hold a grip portion of game console 1100 and maneuver game console 1100 to send signals to the mobile phone to update a user interface of the mobile phone. Further, without changing a grip on game console 1100, the user may move joystick 1102 and/or press buttons 1104. Buttons 1104 may be on one or both sides of the elongated portion of game console 1100. The processor within game console housing 1108 and/or of a mobile device may receive inputs from joystick 1102, buttons, 1104, and/or a position sensor on game console housing 1108 and accordingly update a user interface as described herein.

Advantageously, by providing a joystick on an elongated portion of a game console in the shape of a blaster, a user may easily use the joystick and any buttons surrounding the joystick to update a user interface that is generated by a processor based on such inputs. The systems and methods described herein allow for the processor to dynamically combine the signals from the joystick and position sensors on the game console based on actions of a user handling the game console and/or the content that is currently being shown on the user interface. Further, the blaster device described herein allows for processing to be performed on a remote device using multiple modes of communication. Such modes of communication allow for the user interface to be updated wirelessly with low-latency between inputs to the remote device and corresponding updates to the user interface.

The various illustrative logical blocks, modules, circuits, and algorithm operations described in connection with the examples disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. For example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A portable gaming device, comprising:
a processor within a housing and in communication with a display, a joystick, and a position sensor, the processor having programmed instructions that, when executed, cause the processor to:
receive a first signal from the position sensor indicating a change in orientation of the housing;
receive a second signal from the joystick indicating a change in position of the joystick;
assign a first weight to the first signal and a second weight to the second signal, the first weight and the second weight selected based on a rate of change in position of the joystick or a rate of change in orientation of the housing;
aggregate the first signal with the second signal based on a weighted sum of the weighted first signal and the weighted second signal to obtain a third signal; and
update a user interface on a display according to the third signal.

2. The portable gaming device of claim 1, wherein the programmed instructions, when executed, further cause the processor to dynamically adjust one or both of the aggregation weight of the first signal and the aggregation weight of the second signal responsive to different types of content being displayed on the user interface.

3. The portable gaming device of claim 2, wherein a first type of content displayed on the user interface is a heads up display (HUD) and wherein the wherein the programmed instructions, when executed, cause the processor to adjust the aggregation weight of the first signal and the aggregation weight of the second signal by causing the aggregation weight of the first signal to be larger than the aggregation weight of the second signal.

4. The portable gaming device of claim 1, wherein the programmed instructions, when executed, further cause the processor to:
compare an identification of an object presented in the user interface to identifications of objects stored in a database; and
select a type of content responsive to determining the identification of the object matches a second identification of an object in the database that is associated with the type of content.

5. A method comprising:
receiving, by a processor within a housing, a first signal from a position sensor indicating a change in orientation of the housing;
receiving, by the processor, a second signal from a joystick indicating a change in position of the joystick;
assigning, by the processor, a first weight to the first signal and a second weight to the second signal, the first weight and the second weight selected based on a rate of change in position of the joystick or a rate of change in orientation of the housing;
aggregating, by the processor, the first signal with the second signal based on a weighted sum of the weighted first signal and the weighted second signal to obtain a third signal; and
updating, by the processor, a user interface on a display according to the third signal.

6. The method of claim 5, further comprising:
receiving, by the processor, a third signal from the position sensor indicating a second change in orientation of the housing;
receiving, by the processor, a fourth signal from the joystick indicating a second change in position of the joystick;
comparing, by the processor, the third signal to a first threshold and the fourth signal to a second threshold; and
responsive to determining the third signal does not exceed the first threshold and the fourth signal does not exceed the second threshold, assigning, by the processor, a third predetermined weight to the third signal and a fourth predetermined weight to the fourth signal.

7. The method of claim 6, further comprising:
aggregating, by the processor, the third signal with the fourth signal based on a second weighted sum of the weighted third signal and the weighted fourth signal to obtain a fifth signal; and
updating, by the processor, the user interface on the display according to the fifth signal.

8. The method of claim 5, further comprising dynamically adjusting one or both of the first weight and the second weight responsive to different types of content being displayed on the user interface.

9. The method of claim 5, wherein the type of content is a heads up display (HUD) and wherein adjusting the first weight and the second weight comprises causing the first weight to be larger than the second weight.

10. The method of claim 5, wherein the type of content is a menu and wherein adjusting the first and second weight comprises causing, by the processor, the first or second weight to be zero.

11. The method of claim 5, selecting the type of content comprises:
comparing, by the processor, an identification of the detected object to identifications of objects stored in a database; and
selecting, by the processor, the type of content responsive to determining the identification of the detected object matches a second identification of an object in the database that is associated with the type of content.

\* \* \* \* \*